US012772090B2

(12) United States Patent
Esswie

(10) Patent No.: US 12,772,090 B2
(45) Date of Patent: Oct. 20, 2026

(54) SELECTIVE REPORTING OF QUALITY OF EXPERIENCE OF MULTICAST AND BROADCAST TRAFFIC

(71) Applicant: Dell Products, L.P., Round Rock, TX (US)

(72) Inventor: Ali Esswie, Calgary (CA)

(73) Assignee: Dell Products L.P., Round Rock, TX (US)

( * ) Notice: Subject to any disclaimer, the term of this patent is extended or adjusted under 35 U.S.C. 154(b) by 511 days.

(21) Appl. No.: 18/451,374

(22) Filed: Aug. 17, 2023

(65) Prior Publication Data

US 2025/0063407 A1 Feb. 20, 2025

(51) Int. Cl.

*H04W 24/10* (2009.01)
*H04W 4/06* (2009.01)
*H04L 12/18* (2006.01)

(52) U.S. Cl.

CPC ............ *H04W 24/10* (2013.01); *H04W 4/06* (2013.01); *H04L 12/189* (2013.01)

(58) Field of Classification Search

CPC ....... H04W 24/10; H04W 4/06; H04W 76/27; H04W 28/0268; H04W 40/22;

(Continued)

(56) References Cited

U.S. PATENT DOCUMENTS

2022/0225384 A1 * 7/2022 Takeda .................. H04W 72/04
2023/0138578 A1 5/2023 Azizi et al.

(Continued)

FOREIGN PATENT DOCUMENTS

WO 2023/135539 7/2023
WO WO-2023135539 A1 * 7/2023 ............ H04W 24/10
WO WO-2024173347 A1 * 8/2024 ............ H04W 24/10

OTHER PUBLICATIONS

International Search Report and Written Opinion mailed Apr. 25, 2024 for PCT Application No. PCT/US2023/036319, 16 pages.

(Continued)

*Primary Examiner* — Rebecca E Song
*Assistant Examiner* — Cason H Morse
(74) *Attorney, Agent, or Firm* — Amin, Turocy & Watson, LLP

(57) ABSTRACT

A radio access network node delivering a traffic flow via multicast broadcast service to multiple idle user equipment may determine one of the user equipment as a primary user equipment and the other user equipment as secondary user equipment. A primary user equipment may request quality-of-experience information, or indications, from secondary user equipment. The secondary user equipment may respond to a request for quality-of-experience information with a quality-of-experience metric availability indication or with actual quality-of-experience metric information. An availability indication may be used to reduce the size of a response to the request and also to reduce the size of a quality-of-experience report generated by the primary user equipment and transmitted thereby to the node. The quality-of-experience report may be transmitted by the primary user equipment to the node so that the idle secondary user equipment need not connect to the node to transmit quality-of-experience information.

20 Claims, 15 Drawing Sheets

600

(58) Field of Classification Search
CPC .... H04W 76/40; H04W 52/42; H04L 12/189; H04B 7/0617; H04B 7/0695; H04B 7/088; H04B 7/086; H04B 7/0426; H04B 7/0626
See application file for complete search history.

(56) References Cited

U.S. PATENT DOCUMENTS

| | | | | |
|---|---|---|---|---|
| 2023/0231779 | A1* | 7/2023 | Centonza | H04L 41/5067 370/252 |
| 2023/0262512 | A1* | 8/2023 | Zhang | H04W 28/0268 370/315 |
| 2023/0284058 | A1* | 9/2023 | Eklöf | H04W 24/08 370/252 |
| 2024/0155596 | A1* | 5/2024 | Ganesan | H04B 7/0623 |
| 2025/0133464 | A1* | 4/2025 | Park | H04L 43/08 |

OTHER PUBLICATIONS

Cecilia Eklof et al: "QoE measurements in RRC_INACTIVE and RRC_IDLE", 3GPP Draft; R2-2307967; 3GPP RAN 2, Toulouse, FR; Aug. 2023, [https://www.3gpp.org/ftp/TSG_RAN/WG2_RL2/TSGR2_123/Docs/R2-2307967.zip R2-2307967 -QoE measurements IDLE INACTIVE.docx] 3 pages.

Notification Concerning Transmittal of International Preliminary Report on Patentability for PCT Application No. PCT/US2023/036319, mailed Feb. 26, 2026, 9 pages.

European Office Action mailed Mar. 24, 2026 for European Patent Application No. 23825530.1, 3 pages.

* cited by examiner

300

300

Aggregate QoE availability report

| | Device ID | QoE availability |
|---|---|---|
| A | $x_1$ | True or (1) |
| B | $x_1$ | False or (0) |
| | : | : |
| n | $x_N$ | False or (0) |
| | 410 | 420 |

330

FIG. 4A

SELECTIVE REPORTING OF QUALITY OF EXPERIENCE OF MULTICAST AND BROADCAST TRAFFIC

BACKGROUND

The 'New Radio' (NR) terminology that is associated with fifth generation mobile wireless communication systems ("5G") refers to technical aspects used in wireless radio access networks ("RAN") that comprise several quality-of-service classes (QoS), including ultrareliable and low latency communications ("URLLC"), enhanced mobile broadband ("eMBB"), and massive machine type communication ("mMTC"). The URLLC QoS class is associated with a stringent latency requirement (e.g., low latency or low signal/message delay) and a high reliability of radio performance, while conventional eMBB use cases may be associated with high-capacity wireless communications, which may permit less stringent latency requirements (e.g., higher latency than URLLC) and less reliable radio performance as compared to URLLC. Performance requirements for mMTC may be lower than for eMBB use cases. Some use case applications involving mobile devices or mobile user equipment such as smart phones, wireless tablets, smart watches, and the like, may impose on a given RAN resource loads, or demands, that vary.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

In an example embodiment, a method may comprise receiving, by a first user equipment comprising a processor from a second user equipment, a Quality-of-Experience indication corresponding to the second user equipment and corresponding to receiving a traffic flow by the second user equipment. The method may further comprise generating, by the first user equipment, a Quality-of-Experience report that comprises the Quality-of-Experience indication corresponding to the second user equipment, and transmitting, by the first user equipment to a radio access network node with which the second user equipment is in an idle state, the Quality-of-Experience report.

The Quality-of-Experience indication may correspond to a Quality-of-Experience parameter associated with an application being executed by a processor of the second user equipment. The traffic flow may be a multicast-and-broadcast-service traffic flow.

In an embodiment, the Quality-of-Experience indication may comprise a Quality-of-Experience metric availability indication indicative that a Quality-of-Experience metric is available, at the second user equipment, to be reported to the radio access network node. In an embodiment, the Quality-of-Experience indication may comprise a Quality-of-Experience metric.

The method may further comprise analyzing, by the first user equipment, the Quality-of-Experience metric with respect to a Quality-of-Experience metric criterion to result in an analyzed Quality-of-Experience metric. The metric may be a reception signal strength, a streaming buffer playback, or a buffer delay and the corresponding criterion may be signal strength threshold, a playback threshold, or a delay threshold, respectively. The generating of the Quality-of-Experience report to comprise the Quality-of-Experience indication corresponding to the second user equipment may be based on the analyzed Quality-of-Experience metric being determined to satisfy the Quality-of-Experience metric criterion.

In an embodiment, the Quality-of-Experience indication may comprise a Quality-of-Experience metric unavailability indication indicative that a Quality-of-Experience metric is unavailable, at the second user equipment, to be reported to the radio access network node. The Quality-of-Experience report may comprise the Quality-of-Experience metric unavailability indication.

In an embodiment, the Quality-of-Experience indication may comprise a Quality-of-Experience metric unavailability indication indicative that a Quality-of-Experience metric is unavailable, at the second user equipment, to be reported to the radio access network node, and the first user equipment may avoid including the Quality-of-Experience metric unavailability indication in the Quality-of-Experience report.

In an embodiment, the second user equipment may be served the MBS traffic flow by a serving beam corresponding to the radio access network node, and the method may further comprise transmitting, by the first user equipment, a Quality-of-Experience indication request receivable by the second user equipment and at least a third user equipment that is served by the serving beam corresponding to the radio access network node, wherein the Quality-of-Experience indication request comprises a beam identifier corresponding to the serving beam. The Quality-of-Experience indication request may be transmitted via a sidelink communication link. The Quality-of-Experience report may comprise the first Quality-of-Experience indication associated with an identifier corresponding to the second user equipment and indicative of a first Quality-of-Experience metric corresponding to the receiving of the traffic flow by the second user equipment and a second Quality-of-Experience indication associated with an identifier corresponding to the third user equipment and indicative of a second Quality-of-Experience metric corresponding to the receiving of the traffic flow by the third user equipment.

In another example embodiment, a first user equipment may comprise a processor configured to receive, from a radio access network node while in an idle state with respect to the radio access network node, traffic corresponding to a multicast-broadcast-service traffic flow and receive, from a second user equipment that is receiving the traffic corresponding to the multicast-broadcast-service traffic flow, a quality of experience indication request to indicate, to the second user equipment, a quality of experience indication corresponding to receiving, by the first user equipment, the traffic corresponding to the multicast-broadcast-service traffic flow, wherein the quality of experience indication is to be transmitted by the second user equipment to the radio access network node. The processor may be further configured to perform a quality of experience indication action.

In an embodiment, the second user equipment may be served by a serving beam corresponding to the radio access network node. The processor may be further configured to determine, based on a beam identifier contained in the quality of experience indication request and corresponding to the serving beam, that the first user equipment is being served by the serving beam. The quality of experience indication action may comprise transmitting, to the second user equipment, a quality of experience indication indicative of a quality of experience metric corresponding to receiving, by the first user equipment, the traffic corresponding to the multicast-broadcast-service traffic flow.

In an embodiment, the quality of experience indication request may be a first quality of experience indication request. The processor may be further configured to receive, from a third user equipment that is receiving the traffic corresponding to the multicast-broadcast-service traffic flow and that is served by the serving beam, a second quality of experience indication request to indicate to the third user equipment a quality of experience indication corresponding to receiving, by the first user equipment, the traffic corresponding to the multicast-broadcast-service traffic flow. The quality of experience indication may be transmitted by the third user equipment to the radio access network node. The processor may be further configured to determine that the second user equipment corresponds to a first signal strength that is stronger with respect to the first user equipment than a second signal strength, corresponding to the third user equipment, with respect to the first user equipment, wherein the quality of experience indication action further comprises avoiding transmitting, to the third user equipment, a quality of experience indication indicative of a quality of experience metric corresponding to receiving, by the first user equipment, the traffic corresponding to the multicast-broadcast-service traffic flow.

In an embodiment, the second user equipment may be served by a serving beam corresponding to the radio access network node. The processor may be further configured to determine, based on a beam identifier contained in the quality of experience indication request and corresponding to the serving beam, that the first user equipment is being served by a different beam than the serving beam, wherein the quality of experience indication action comprises avoiding transmitting, to the second user equipment, a quality of experience indication indicative of a quality of experience metric corresponding to receiving, by the first user equipment, the traffic corresponding to the multicast-broadcast-service traffic flow.

In an embodiment, the quality of experience indication action may comprise transmitting, to the second user equipment, a quality of experience indication indicative of a quality of experience metric corresponding to receiving, by the first user equipment, the traffic corresponding to the multicast-broadcast-service traffic flow. The second user equipment may transmit, to the radio access network node, the quality of experience indication. The processor may be further configured to receive, from the radio access network node, a connection establishment request, transmission of which is facilitated by the radio access network node in response to the quality of experience indication. Responsive to the connection establishment request, the processor may be further configured to establish a connection with the radio access network node. The processor may be further configured to transmit, to the radio access network node, the quality of experience metric.

In yet another example embodiment, a non-transitory machine-readable medium, may comprise executable instructions that, when executed by a processor of a primary user equipment, facilitate performance of operations, that may comprise receiving, from a radio access network node, a primary user equipment configuration that configures the primary user equipment to generate quality of experience reports. The operations may further comprise receiving, from a secondary user equipment, quality of experience information corresponding to the second user equipment and corresponding to receiving a multicast-broadcast-service traffic flow by the second user equipment. Responsive to receiving the quality of experience information, the operations may further comprise generating a quality of experience report that comprises the quality of experience information corresponding to the secondary user equipment, and transmitting, to the radio access network node with respect to which the second user equipment is in an idle state, the quality of experience report.

In an embodiment, the primary user equipment may be served by a serving beam corresponding to the radio access network node. The operations may further comprise receiving, from the radio access network node, a performance indication paging message corresponding to the serving beam. Responsive to the performance indication paging message, the operations may further comprise transmitting, to the radio access network node, a beam signal strength indication indicative of a signal strength corresponding to the serving beam with respect to the primary user equipment. The primary user equipment configuration may be directed to the primary user equipment by the radio access network node based on the beam signal strength indication. The primary user equipment may avoid entering a connected state with respect to the radio access network node to transmit the beam signal strength indication.

In an embodiment, the primary user equipment configuration may further configure the primary user equipment to transmit, to the second user equipment, a quality of experience information request to transmit to the first user equipment the quality of experience information.

In an embodiment, the primary user equipment configuration may be received from the radio access network node based on the primary user equipment being served by a serving beam corresponding to the radio access network node. The primary user equipment configuration may be received from the radio access network node based on the serving beam being determined to be a best beam with respect to the primary user equipment according to a signal strength measurement, associated with the serving beam, that was transmitted by the primary user equipment when the primary user equipment was most recently in a connected state with respect to the radio access network node.

BRIEF DESCRIPTION OF THE DRAWINGS

FIG. 4A illustrates a quality of experience report comprising quality of experience availability indications.

DETAILED DESCRIPTION OF THE DRAWINGS

Figure 1:
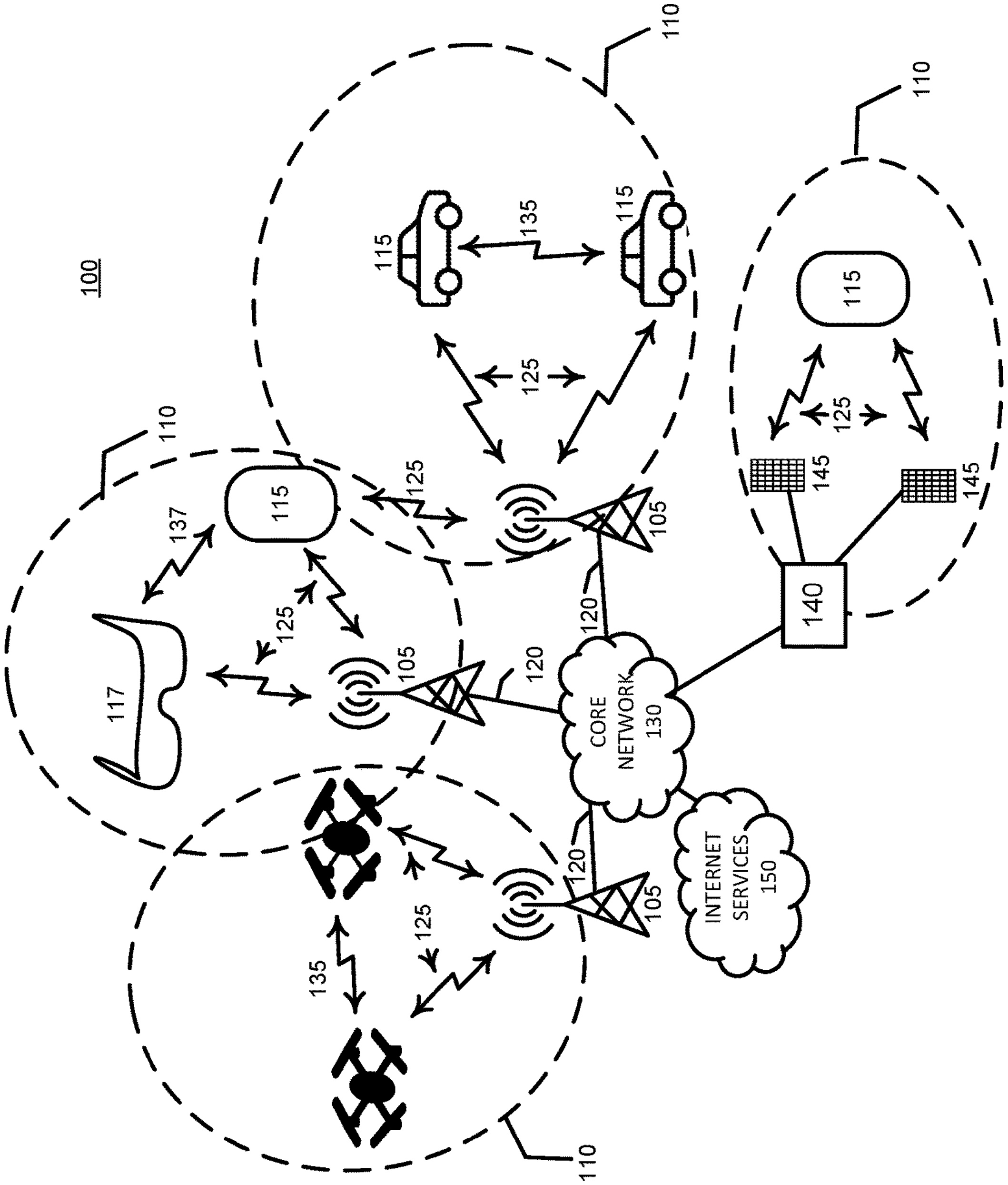
FIG. 1 illustrates wireless communication system environment.

As a preliminary matter, it will be readily understood by those persons skilled in the art that the present embodiments are susceptible of broad utility and application. Many methods, embodiments, and adaptations of the present application other than those herein described as well as many variations, modifications and equivalent arrangements, will be apparent from or reasonably suggested by the substance or scope of the various embodiments of the present application.

Accordingly, while the present application has been described herein in detail in relation to various embodiments, it is to be understood that this disclosure is illustrative of one or more concepts expressed by the various example embodiments and is made merely for the purposes of providing a full and enabling disclosure. The following disclosure is not intended nor is to be construed to limit the present application or otherwise exclude any such other embodiments, adaptations, variations, modifications and equivalent arrangements, the present embodiments described herein being limited only by the claims appended hereto and the equivalents thereof.

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component can be, but is not limited to being, a process running on a processor, a processor, an object, an executable, a thread of execution, computer-executable instructions, a program, and/or a computer. By way of illustration and not limitation, both an application running on a server and the server can be a component.

One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

The term "facilitate" as used herein is in the context of a system, device or component "facilitating" one or more actions or operations, in respect of the nature of complex computing environments in which multiple components and/or multiple devices can be involved in some computing operations, Non-limiting examples of actions that may or may not involve multiple components and/or multiple devices comprise transmitting or receiving data, establishing a connection between devices, determining intermediate results toward obtaining a result, etc. In this regard, a computing device or component can facilitate an operation by playing any part in accomplishing the operation. When operations of a component are described herein, it is thus to be understood that where the operations are described as facilitated by the component, the operations can be optionally completed with the cooperation of one or more other computing devices or components, such as, but not limited to, sensors, antennae, audio and/or visual output devices, other devices, etc.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Turning now to the figures, FIG. 1 illustrates an example of a wireless communication system 100 that supports blind decoding of PDCCH candidates or search spaces in accordance with aspects of the present disclosure. The wireless communication system 10 may include one or more base stations 105, one or more UEs 115, and core network 130. In some examples, the wireless communication system 100 may be a Long Term Evolution (LTE) network, an LTE-Advanced (LTE-A) network, an LTE-A Pro network, or a New Radio (NR) network. In some examples, the wireless communication system 100 may support enhanced broadband communications, ultra-reliable (e.g., mission critical) communications, low latency communications, communications with low-cost and low-complexity devices, or any combination thereof. As shown in the figure, examples of UEs 115 may include smart phones, automobiles or other vehicles, or drones or other aircraft. Another example of a UE may be a virtual reality appliance 117, such as smart glasses, a virtual reality headset, an augmented reality headset, and other similar devices that may provide images, video, audio, touch sensation, taste, or smell sensation to a wearer. A UE, such as VR appliance 117, may transmit or receive wireless signals with a RAN base station 105 via a long-range wireless link 125, or the UE/VR appliance may receive or transmit wireless signals via a short-range wireless link 137, which may comprise a wireless link with a UE device 115, such as a Bluetooth link, a Wi-Fi link, and the like. A UE, such as appliance 117, may simultaneously communicate via multiple wireless links, such as over a link 125 with a base station 105 and over a short-range wireless link. VR appliance 117 may also communicate with a wireless UE via a cable, or other wired connection. A RAN, or a component thereof, may be implemented by one or more computer components that may be described in reference to FIG. 10.

Continuing with discussion of FIG. 1, base stations 105 may be dispersed throughout a geographic area to form the wireless communication system 100 and may be devices in different forms or having different capabilities. The base stations 105 and the UEs 115 may wirelessly communicate via one or more communication links 125. Each base station 105 may provide a coverage area 110 over which UEs 115 and the base station 105 may establish one or more communication links 125. Coverage area 110 may be an example of a geographic area over which a base station 105 and a UE 115 may support the communication of signals according to one or more radio access technologies.

UEs 115 may be dispersed throughout a coverage area 110 of the wireless communication system 100, and each UE 115 may be stationary, or mobile, or both at different times. UEs 115 may be devices in different forms or having different capabilities. Some example UEs 115 are illustrated in FIG. 1. UEs 115 described herein may be able to communicate with various types of devices, such as other UEs 115, base stations 105, or network equipment (e.g., core network nodes, relay devices, integrated access and backhaul (IAB) nodes, or other network equipment), as shown in FIG. 1.

Base stations 105 may communicate with the core network 130, or with one another, or both. For example, base stations 105 may interface with core network 130 through one or more backhaul links 120 (e.g., via an S1, N2, N3, or other interface). Base stations 105 may communicate with one another over the backhaul links 120 (e.g., via an X2. Xn, or other interface) either directly (e.g., directly between base stations 105), or indirectly (e.g., via core network 130), or both. In some examples, backhaul links 120 may comprise one or more wireless links.

One or more of base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a bNodeB or gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, or a router. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, vehicles, or smart meters, among other examples.

UEs 115 may be able to communicate with various types of devices, such as other UEs 115 that may sometimes act as relays as well as base stations 105 and the network equipment including macro eNBs or gNBs, small cell eNBs or gNBs. or relay base stations, among other examples, as shown in FIG. 1.

UEs 115 and base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. Wireless communication system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by UEs 115. A carrier may be operated in a standalone mode where initial acquisition and connection may be conducted by UEs 115 via the carrier, or the carrier may be operated in a non-standalone mode where a connection is anchored using a different carrier (e.g., of the same or a different radio access technology).

Communication links 125 shown in wireless communication system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications e.g., in a TDD mode).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communication system 100 (e.g., the base stations 105, the UEs 115, or both) may have hardware configurations that support communications over a particular carrier bandwidth or may be configurable to support communications over one of a set of carrier bandwidths. In some examples, the wireless communication system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the LIE. A wireless communications resource may refer to a combination of a radio frequency spectrum resource, a time resource (e.g., a search space), or a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for a UE 115 may be restricted to one or more active BWPs.

The time intervals for base stations 105 or UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_r$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods e.g., depending on the length of the cyclic prefix prepended to each symbol period). In some wireless communication systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communication system 100 and may be referred to as a transmission time interval (TTI). In some examples, the TTI duration (e.g., the number of symbol periods in a TTI) may be variable. Additionally. or alternatively, the smallest scheduling unit of the wireless communication system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of UEs 115. For example, one or more of UEs 115 may monitor or search control regions, or spaces, for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115. Other search spaces and configurations for monitoring and decoding them are disclosed herein that are novel and not conventional.

A base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID) or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of a base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., UEs 115 in a closed subscriber group (CSG), UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communication system 100 may include, for example, a heterogeneous network in which different types of the base stations 105 provide coverage for various geographic coverage areas 110 using the same or different radio access technologies.

The wireless communication system 100 may support synchronous or asynchronous operation. For synchronous operation, the base stations 105 may have similar frame timings, and transmissions from different base stations 105 may be approximately aligned in time. For asynchronous operation, base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communication system 100 may be configured to support ultra-reliable communications or low-latency communications, or various combinations thereof. For example, the wireless communication system 100 may be configured to support ultra-reliable low-latency communications (URLLC) or mission critical communications. UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). Communication link 135 may comprise a sidelink communication link. One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of UEs 115 communicating via D2D communications may utilize a one-to-many (1:M) system in which a UE transmits to every other UE in the group. In some examples, a base station 105 facilitates the scheduling of resources for D2D communications. In other cases. D2D communications are carried out between UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more RAN network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. Core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for UEs 115 that are served by the base stations 105 associated with core network 130. User IP packets may be transferred through the user plane entity, which may provide IP address allocation as well as other functions. The user plane entity may be connected to IP services 150 for one or more network operators. IP services 150 may comprise access to the Internet. Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices e.g., radio heads and ANCs) or consolidated into a single network device (e.g., a base station 105).

The wireless communication system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communication system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communication system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communication system 100 may utilize both licensed and unlicensed radio frequency spectrum bands. For example, the wireless communication system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as base stations 105 and UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally. or alternatively, an antenna panel may support radio frequency beamforming for a signal transmitted via an antenna port.

Base stations 105 or UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, a base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by a base station 105 in different directions and may report to the base station an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). A UE 115 may report feedback that indicates precoding weights for one or more beam directions, and the feedback may correspond to a configured number of beams across a system bandwidth or one or more sub-bands. A base station 105 may transmit a reference signal (e.g., a cell-specific reference signal (CRS), a channel state information reference signal (CSI-RS)), which may be precoded or unprecoded. A UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communication system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A feature of 5G is the ability to support multicast and broadcast services ("MBS"), which allow for efficient delivery of multimedia content to a large number of users simultaneously. A reference herein to 'multicast' may be a reference to MBS. MBS content may be transmitted to user equipment that may have subscribed to receive the MBS content. MBS content may be broadcast to all user equipment within range of a RAN when a subscription is not required to receive the content, for example, to receive emergency information or alerts. Multicast broadcast services may comprise the capability of 5G networks to transmit data packets from a single source to multiple destinations according to a point-to-multipoint ("P2MP") communication model. This is in contrast to unicast services with traffic data packets being sent from a single source to a single destination in a point-to-point ("P2P") communication model. With 5G MBS, a single copy of the multimedia content can be sent to multiple users, thus reducing transmission of duplicate data and optimizing network resources.

5G MBS may lead to communication improvements in various industries, including media and entertainment, public safety, transportation, and industrial automation. In the media and entertainment industry, for example, 5G MBS can enable the delivery of high-quality video and audio content to a large number of users simultaneously, such as live sports events or concerts. This can provide an immersive and engaging experience to users, thus opening up new opportunities for content providers and advertisers.

In the public safety sector, 5G MBS can be utilized for emergency communication and broadcasting critical information to first responders and the general public during disasters or emergencies. This can facilitate timely and efficient dissemination of important information, helping to save lives and minimize damage. In the transportation industry, 5G MBS can enable reliable and low-latency communication for connected vehicles, allowing for real-time traffic management, vehicle-to-vehicle ("V2V") communication, and vehicle-to-infrastructure ("V2I") communication. This can enhance road safety, traffic efficiency, and enable autonomous driving capabilities. With respect to industrial automation, 5G MBS can support remote monitoring, control, and management of industrial processes, enabling real-time data collection, analysis, and decision-making. This can improve operational efficiency, reduce equipment downtime, and facilitate new business models in the industrial sector.

Using conventional techniques, delivering a significant amount of MBS data volume to a large number of user equipment requires that the user equipment be connected to a RAN node to receive the MBS payload. Thus, for each user equipment, separate independent connection establishment signaling, control channel search space, and scheduling grants are established. Such separate resource scheduling and signaling may result in a large signaling overhead for a large number of MBS devices, which may lead to poor overall network spectral efficiency.

Conventional techniques facilitate delivering MBS traffic to idle mode user equipment to avoid associated signaling overhead but without support for delivering MBS content according to a specified Quality-of-Experience corresponding to a user's experience in receiving or consuming (e.g., viewing) MBS content. Quality-of-Experience may be impacted by latency, reliability, or other performance parameter metrics corresponding to communication of MBS traffic to an idle mode user equipment. Embodiments disclosed herein may facilitate efficient delivery of MBS content traffic to a group of user equipment in idle mode (e.g., user equipment are not currently/actively connected to a radio access network node or that are not actively engaged in any data transmission) that have been configured via a subscription, or via an application, to receive the MBS content, even when the user equipment are in a low power state (e.g., RRC IDLE or RRC INACTIVE) through efficient use of multicast group management, network scheduling, and device synchronization mechanisms.

Delivering content to multiple user equipment via an MBS traffic flow may facilitate a radio access network node in delivering the same high-capacity and/or high-volume content stream, or flow, towards a large group of user equipment devices within a confined area using a single control channel and limited scheduling processing. For example, a radio access network node, delivering MBS content to multiple user equipment may use a single scheduling instant and a single control channel information transmission to schedule the same payload to all of the user equipment with one 'shot' rather than scheduling and controlling each device independently for user equipment 'interested' in receiving the very same content, for example content corresponding to a live sporting event being transmitted to user equipment in a stadium wherein the sporting event is taking place. Thus, delivering MBS content to user equipment that are in an idle state, or while in an inactive state, may facilitate reduction of network signaling and processing overhead that might otherwise occur if a large group of user equipment devices attempt to connect to a radio access network node simultaneously by performing signaling-heavy and energy-heavy RRC connection establishment procedures to receive the same MBS live content.

MBS content delivery in idle mode may use user equipment feedback user feedback to facilitate delivery of the MBS traffic. For example, a quality of receiving an MBS payload may correspond to real-time MBS application performance indicators, (e.g., the buffering and playback of a live MBS streaming application at a device), which may be referred to as quality of experience ("QoE") indications. Thus, for a user equipment device in idle state that is receiving content via an MBS session, QoE indicators must typically be reported back to the radio access network node for purposes of facilitating MBS session quality control.

However, to track the actual received quality of the MBS content at user equipment devices, the user equipment devices must report back to the RAN node various application-specific performance indicators, that may be important for MBS use cases, such as, for example, streaming buffer playback, buffer delay, etc., or other Quality-of-Experience parameter metrics. Since user equipment may receive MBS traffic while idle (e.g., while not connected to a serving RAN that is delivering the MBC traffic), reporting of QoE information may not be according to conventional techniques, which may result in delivery of the MBS traffic to a user equipment as a best effort traffic flow with respect to which user equipment experience information is neither tracked nor used to optimize the traffic flow. According to conventional techniques, a user equipment receiving MBS traffic may, when a QoE metric report is available from an MBS application layer, trigger RAN node connected establishment. However, this contradicts the key purpose of delivering the MBS payload towards idle mode user equipment devices since the idle mode user equipment will end up establishing a large number of network connections simultaneously or within a very short period.

Due to devices being in idle mode, QoE reporting may trigger user equipment that are in an idle state and that are receiving MBS traffic to perform full network connection establishments in order to relay those QoE key performance indicators ("KPI"), thus resulting in the same legacy problem that supposedly is solved by transmitting MBS traffic to multiple user equipment while idle of having many MBS-receiving user equipment devices attempting energy-heavy and signaling-overhead-heavy network connection establishment at the same time, thus resulting a sudden degradation of cell capacity corresponding to the RAN node that is facilitating transmitting of the MBS traffic. Accordingly, in effect, consumption of signaling overhead that might be achieved by transmitting MBS to user equipment in idle mode may be just shifted in time if all user equipment receiving an MBS content payload stream all connect to a serving RAN node (e.g., a RAN node that is serving the MBS traffic payload to the user equipment devices) to report Quality-of-Experience parameter metrics, or Quality-of-Experience indications.

Figure 12A:
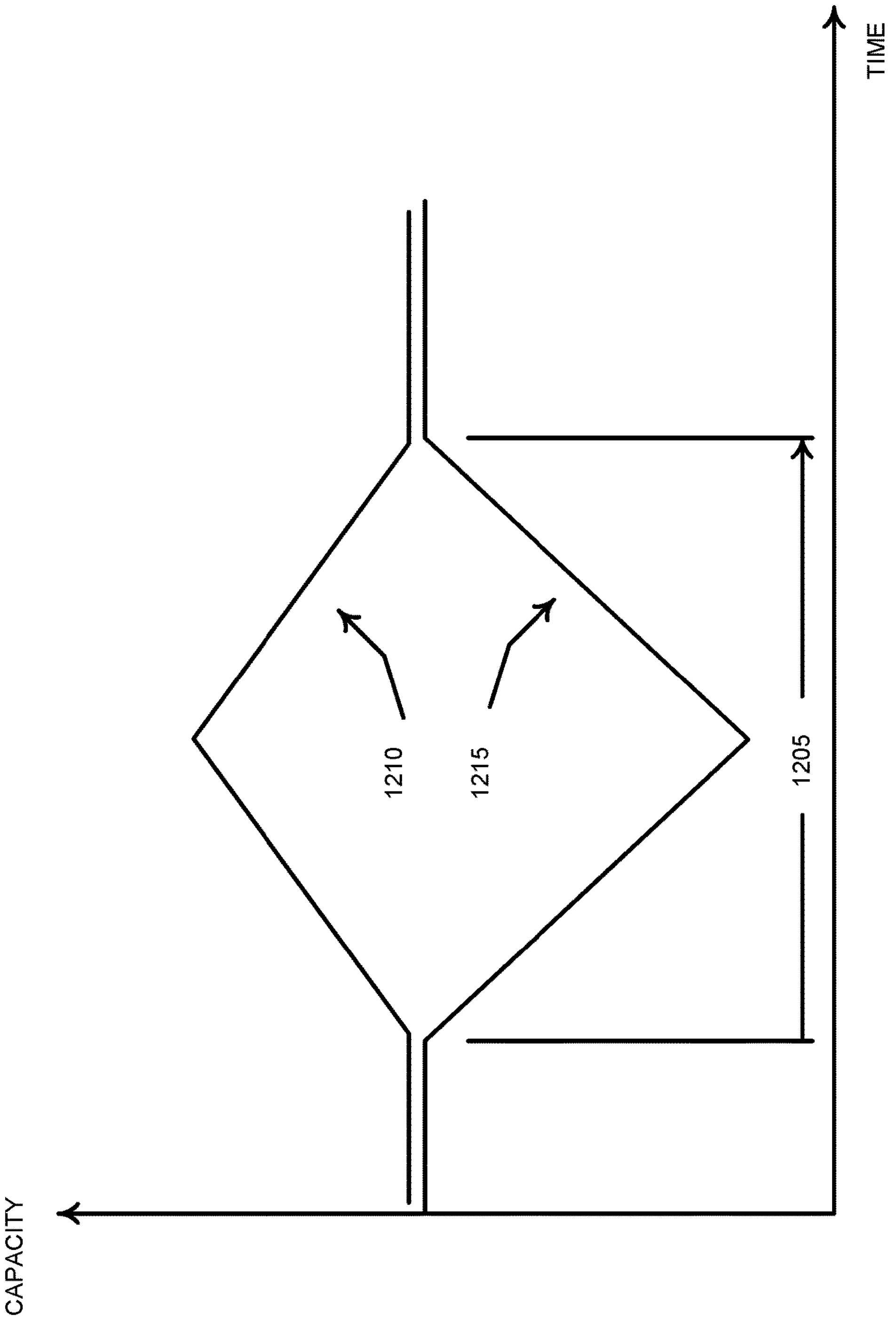
FIG. 12A illustrates a graph of radio access network node capacity versus time for a number of user equipment establishing a connection to the radio access network node to report quality of experience metrics.
Figure 12B:
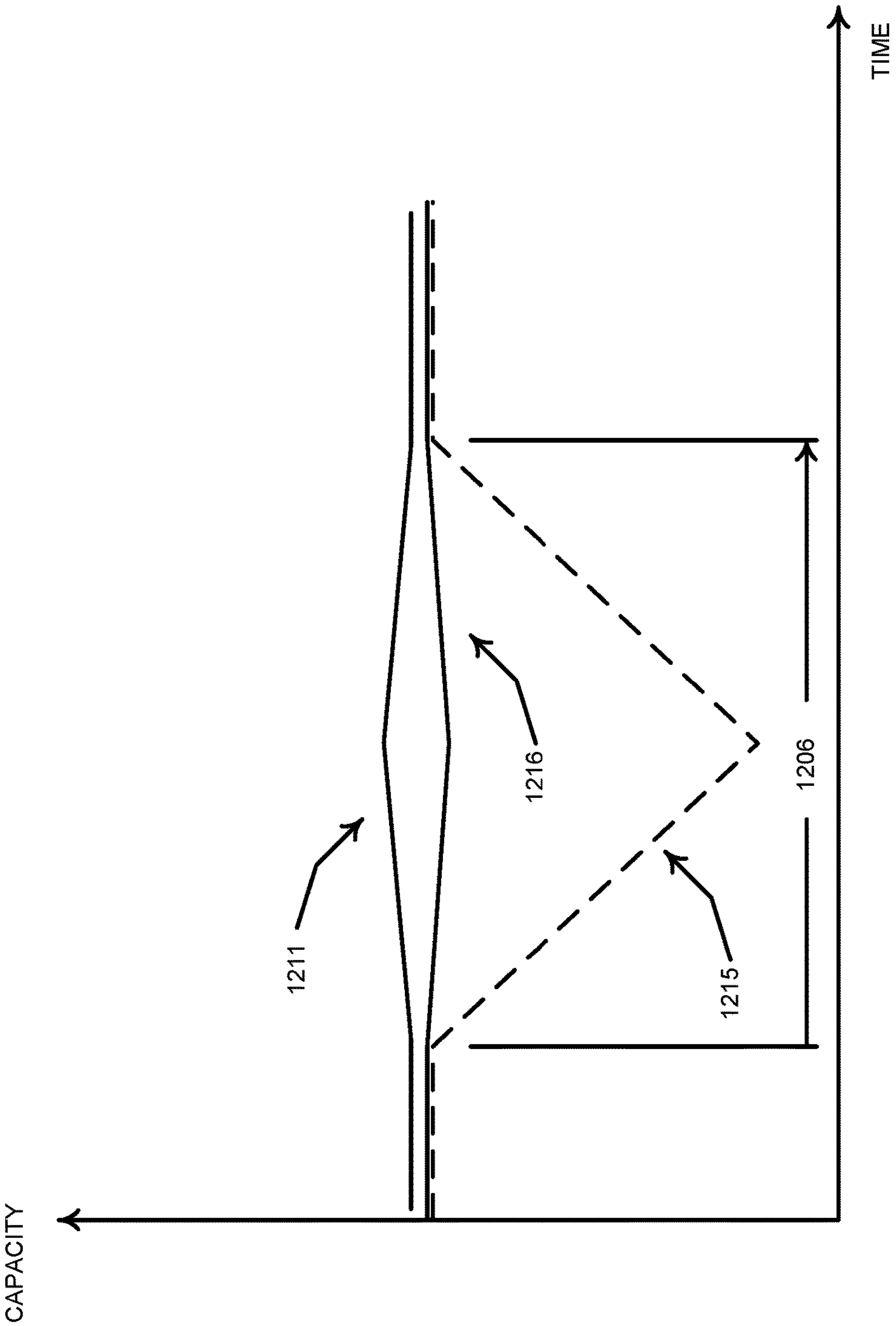
FIG. 12B illustrates a graph of radio access network node capacity versus time for a reduced number of user equipment establishing a connection to the radio access network node to report quality of experience metrics corresponding to other, idle mode, user equipment.

As shown in FIG. 12A, capacity 1215 corresponding to a radio access network node is inversely proportional to a number 1210 of user equipment establishing a connection with the radio access network node during period 1205 to report quality of experience metrics or indications. In contrast, as shown in FIG. 12B, by using embodiments disclosed herein, a reduced number 1211 of user equipment are attempting connection to a radio access network node during period 1206 to report quality of experience metrics, thus resulting in much less depletion 1216 of resources corresponding to the radio access network node as compared to depletion of resources 1215 described in reference to FIG. 12A and shown in FIG. 12B in dashed lines.

According to embodiments disclosed herein, user equipment may implement a device-collaborative signaling procedure for reporting MBS QoE parameter metrics, while avoiding most of the idle mode user equipment that are receiving an MBS traffic flow attempting RRC network connections at the same time, and thus avoiding a corresponding capacity drop corresponding to the RAN node. Embodiments disclosed herein may capitalize on the fact that in many scenarios where MBS traffic flows are transmitted to many user equipment devices, such as large sporting events, concerts, gatherings, high-density vehicle traffic, or public service announcements/alerts, user equipment receiving MBS traffic may be located in proximity to each other and thus, for each available downlink beam corresponding to a radio access network node, one or more of the user equipment receiving the MBS traffic flow may be determined to be primary MBS devices. A primary user equipment may perform certain configured operations, such as, for example, collect and report to the RAN node aggregated QoE indications or aggregated QoE metrics received from other user equipment, which may be referred to as secondary user equipment devices that may be 1) served by the same downlink beam corresponding to the RAN node, 2) are in relative close proximity to the primary user equipment, and 3) may be are receiving the same MBS traffic flow. Thus, according to embodiments disclosed herein only the subset of user equipment devices receiving a given MBS traffic flow may perform network connection establishment to relay the collected and aggregated QoE information corresponding to the primary and secondary user equipment devices.

In an embodiment, primary-device-to-secondary-device communications may be facilitated by medium-range 5G sidelink communication links (for example a link 135 shown in FIG. 1) or by short-range communication links (which are typically implementation specific). Primary user equipment devices may report QoE information to a serving RAN node according to several techniques, based on available processing and energy capability of a given primary device. In an embodiment, a low-processing-capable primary device may be dynamically configured by a serving RAN network to only report QoE availability indications indicative that QoE parameter metrics are available for reporting by an idle mode secondary user equipment rather than the primary user equipment reporting actual QoE parameter metrics corresponding to secondary user equipment receiving a given MBS traffic flow. Reporting of availability or parameter metrics instead of reporting actual QoE parameter metrics corresponding to receiving of MBS traffic may be based on whether the actual metrics satisfy a QoE reporting criterion, for example a threshold. Thus, the radio access network node may be made aware that although a secondary user equipment has indicated an availability of a QoE parameter metric for reporting to the RAN node, (e.g., one or more QoE parameter metric(s) is/are buffered by a secondary idle-mode user equipment), the QoE parameter metrics are indicative of reasonably good QoE such that reporting of actual parameter metrics may not be needed. Such reporting of an availably indication rather than reporting of actual metrics may be beneficial insofar as an availability indication may comprise a single bit (e.g., '0' indicates no QoE parameter metrics available for reporting or '1' being indicative that at least one parameter metric is buffered and available for reporting by a secondary user equipment that is in idle mode) to reduce resources used for reporting since an actual QoE performance metric may comprise more bits (e.g., ten or more bits).

Selective Quality of Experience Reporting of Multicast Broadcast Traffic

According to embodiments disclosed herein, during an active multicast broadcast service ("MBS") traffic session, where traffic payload is delivered by a radio access network node via multicast broadcast service towards idle/inactive user equipment devices, the RAN node may determine a set of primary user equipment devices from among multiple user equipment that are receiving the MBS-delivered content, for each available downlink beam corresponding to the RAN node. In an embodiment, determination/designation of an idle user equipment as a primary user equipment may be based on determination, by the RAN node, of the user equipment's best downlink beam corresponding to the RAN node and the user equipment's received coverage level (e.g., signal strength of a signal corresponding to RAN node received by the user equipment) when the user equipment was last connected to the RAN node. The RAN node may configure one or more idle user equipment from among multiple idle user equipment that have been configured to receive, and that are receiving, a traffic flow via MBS as a primary user equipment. The RAN node may configure one or more user equipment that are receiving the MBS traffic via a given beam, corresponding to the RAN node, to act as QoE-reporting primary user equipment with respect to the beam via a primary user equipment configuration.

In another embodiment, determination/designation of an idle/inactive user equipment that is configured to receive MBS traffic from a RAN node as a primary user equipment that reports QoE information to a RAN node may be facilitated by on-demand paging requests. A RAN node may determine a first set of one or more primary devices corresponding to each of multiple beams based on responses to paging request messages, and may repeat the paging method until primary devices are determined for each beam facilitating the delivery of MBS traffic to idle user equipment. The RAN node may transmit an on-demand primary-device-determining paging indication via a downlink resource set(s) associated with a specific beam. A primary-device-determining paging indication message may not comprise an explicit identifier corresponding to a user equipment because the RAN node may not page a specific user equipment device when determining primary user equipment. Instead, in an embodiment, a primary-device-determining paging indication message may comprise a beam identifier, that may facilitate user equipment served by the specific beam to decode the primary-device-determining paging indication message and the user equipment that decode the primary-device-determining paging indication message may respond thereto to the RAN node. A primary-device-determining paging indication message may be referred to as a performance indication paging message.

In an embodiment, a primary-device-determining paging indication message may comprise a device-group identifier to which only user equipment that were previously configured as belonging to a group corresponding to the device-group identifier may respond to the primary-device-determining indication message. Thus, other user equipment, even those being served by the same beam via which the primary-device-determining paging indication message is transmitted, that do not correspond to the device group associated with the device group identifier cannot decode the primary-device-determining paging indication message. Accordingly, a device group identifier may facilitate combining user equipment devices served by a certain downlink beam and that are receiving the same MBS payload or session for receiving of a primary-device-determining paging indication message.

If an idle user equipment receiving MBS traffic successfully decodes a primary-device-determining paging indication, the user equipment may respond back to the RAN node that transmitted the primary-device-determining paging indication message with an uplink preamble and a short coverage report that indicates a received coverage level from the serving RAN node on that beam (e.g., the received coverage level may be a signal strength value, as determined by the user equipment, corresponding to the serving beam). The RAN node may determine, based on receiving one or more coverage reports from one or more user equipment, which user equipment to deem, or designate, as primary user equipment. The RAN node may then configure user equipment designated by the RAN node as a primary user equipment via a primary user equipment configuration. A primary-device-determining paging indication is novel with respect to conventional paging messages at least because a primary-device-determining paging indication message may implicitly convey (e.g., may be configured, or hard coded, in user equipment) that the primary-device-determining paging indication message is not meant to indicate to a user equipment that the user equipment is to transition from an idle state to a connected state. Instead, a primary-device-determining paging indication message may indicate to a user equipment to transmit a short coverage report, instead of performing full RRC connection establishment, which is what user equipment conventionally do upon receiving and decoding a paging indication according to conventional techniques.

After being determined/designated as a primary user equipment corresponding to a certain MBS downlink beam, the primary user equipment may transmit a QoE report request, which may be referred to as a quality of experience indication request, towards secondary devices in proximity that are receiving the same MBS content as the primary user equipment and that are receiving such content on the same downlink beam as the primary device. (It will be appreciated that user equipment that are receiving the same MBS traffic flow as a primary user equipment but that are not designated as a primary user equipment may be referred to as secondary user equipment.) A QoE report request may comprise an indication indicative of a downlink beam identifier, or index, that is serving a primary user equipment. In an embodiment, transmission of a QoE report request may be exchanged via a sidelink interface link using a novel sidelink control signal message to carry QoE requests and QoE feedback indications. In another embodiment, QoE feedback may be exchanged between user equipment via device-specific communication links.

A primary user equipment may receive from secondary user equipment QoE indications that comprise one or more QoE parameter metric(s) being available at a secondary user equipment or that comprise one or more actual QoE metric (s) corresponding to secondary user equipment that send the QoE indication(s) to the primary user equipment. A primary device may compile an aggregate QoE report or QoE availability report, which may be referred to as a QoE report, and may establish an RRC connection with a RAN node to transmit thereto the compiled aggregated QoE report as an uplink control and/or scheduled data signal message towards the serving RAN node. In an embodiment, a primary device may only report one-bit metric availability indications, indicating the availability of QoE parameter metrics at one or more secondary user equipment. If a primary user equipment transmits to a serving RAN node a QoE report that comprises a QoE metric availability indication corresponding to a secondary user equipment instead of the report comprising an actual QoE metric value, the RAN node may determine whether to page the secondary user equipment to cause the secondary user equipment can connect with the RAN node and report actual QoE metrics. Thus, the primary user equipment may avoid, or minimize, processing of larger amounts of data (an actual metric may comprise multiple bytes whereas an availability indication is one bit) while, depending on a current state, or condition, of cell congestion and resource allocation, the serving RAN node may request on-demand connection establishment by one or more of the secondary user equipment for which only an availability indication is reported in a QoE report, for reporting of actual QoE parameter metric(s)/value(s) to the RAN node.

In another embodiment, a primary user equipment may aggregate QoE indications received from secondary user equipment in proximity to the primary user equipment, and compile an aggregated QoE report comprising actual QoE metrics corresponding to the secondary user equipment and associated with user equipment identifiers corresponding to the secondary user. Thus, network connections are minimized (e.g., number of user equipment in a connected state with a serving RAN node is minimized) because only primary devices for a given beam establish a connection to transmit an aggregated QoE report to the serving RAN node, but actual QoE parameter metrics corresponding to all primary and secondary user equipment are provided to the serving RAN that is transmitting the MBS traffic flow to the user equipment. In an embodiment, primary user equipment may be dynamically configured only to report actual metrics corresponding to a given secondary user equipment if the metrics corresponding thereto do not satisfy a configured QoE parameter criterion, for example a threshold, that may correspond to a poor QoE perceived at the secondary user equipment. In another example, a primary user equipment may be configured to only report actual metrics a configured number of QoE reporting occasions, thus skipping intervening reporting occasions for reporting of actual metrics for one or more secondary user equipment. Only reporting to the serving RAN node actual QoE metrics when a perceived QoE is poor at secondary user equipment or by skipping intervening configured reporting occasions may facilitate reducing the size of an aggregated QoE report transmitted by a primary user equipment but may incur an elevated processing load at the primary user equipment.

According to existing techniques, idle mode user equipment perform network connection establishment to provide performance and application report back to a serving RAN node, which may undermine a basic purpose of delivering MBS payload for devices in an idle state if the multiple user equipment substantially simultaneously connect to the RAN node to provide metric reports thereto. According to conventional techniques, if idle mode user equipment receiving MBS traffic avoid connecting to the network to report QoE information, MBS delivery to the idle user equipment essentially becomes best effort traffic since user equipment QoE performance is not tracked at the RAN node and thus the RAN node cannot optimize transmission to a given user equipment based on perceived QoE at the user equipment, which may be influenced by channel conditions between the serving RAN node and the user equipment. Furthermore, according to conventional techniques, a user equipment only compiles and reports to a RAN node QoE information corresponding to itself.

According to embodiments disclosed herein, when there is an MBS QoE report available at an idle-mode user equipment, the user equipment may not establish a RAN network connection nor flush available QoE information, but instead may transmit, via a medium-range communication link, such as a sidelink communication link, a control signal message carrying an indication of an available QoE report towards another user equipment that may be configured as a primary user equipment. Accordingly, embodiments disclosed herein may facilitate a RAN node reliably transmitting an MBS traffic flow to multiple idle user equipment without inflicting a significant surge of network connections during a short period of time.

Figure 2:
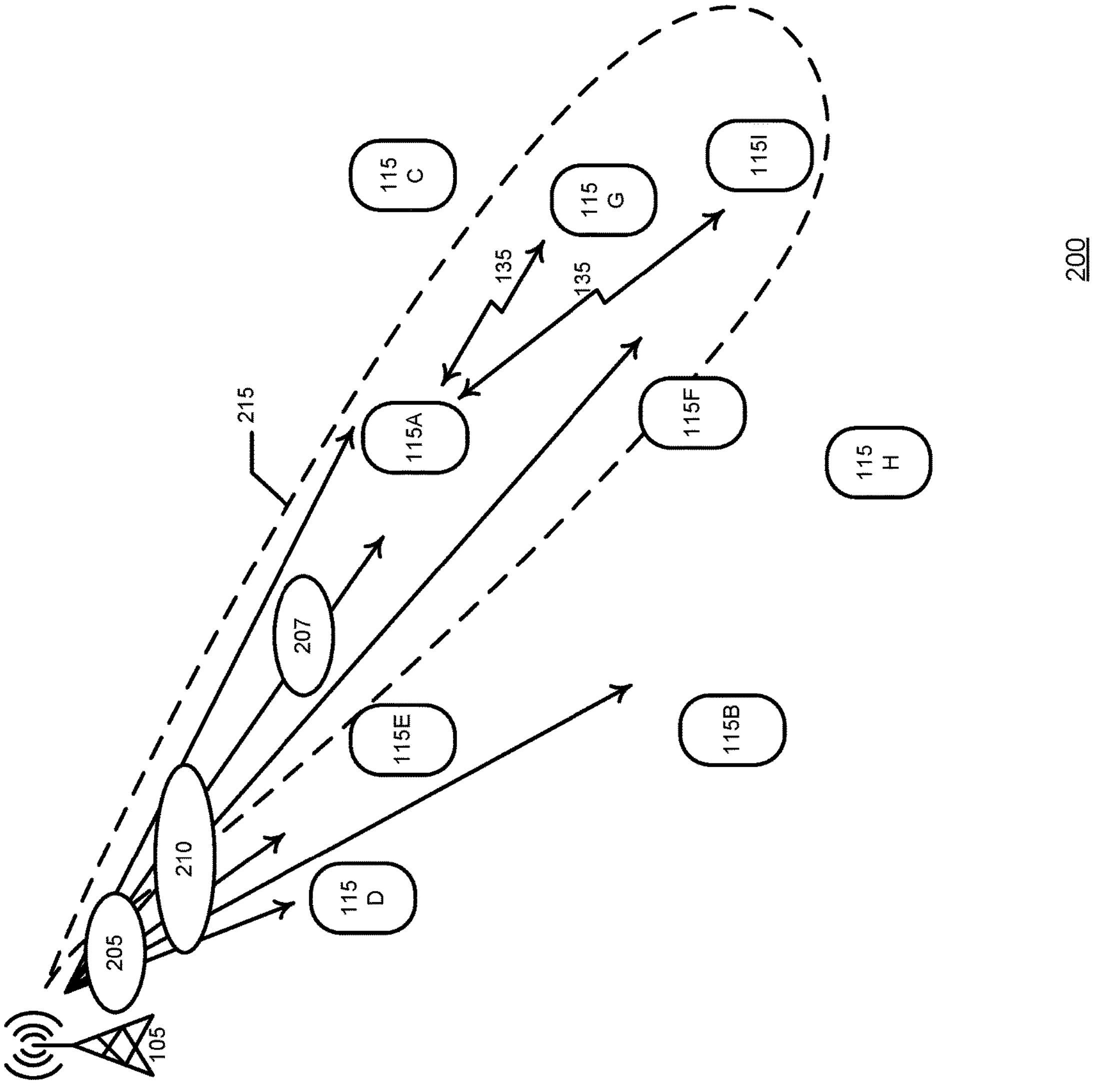
FIG. 2 illustrates an example environment with multicast content being transmitted via multicast transmission to idle state user equipment.

Turning now to FIG. 2, the figure illustrates environment 200 in which radio access network node 105 transmits to user equipment 115A-115I a multicast configuration 205 corresponding to multicast-broadcast content 210, such as, for example, a traffic flow comprising image frames that may be video image frames, to the user equipment while at least one of user equipment is idle, or in an idle mode/state, for example in an RRC IDLE state. A primary user equipment configuration 207 may be transmitted to a used equipment deemed to be a primary user equipment, such as, for example UE 115A. Multicast content 210 may be transmitted to user equipment 115A-115I while the user equipment is/are idle (e.g., not in an RRC CONNECTED state). As shown in FIG. 2, user equipment 115A-115I are receiving MBS traffic 210, but only UE 115A, UE 115F, UE 115G, and UE 115I are served by serving beam 215 corresponding to RAN 105. (UE 115F may be served by a beam having a coverage pattern adjacent to beam 215 since the UE 115F is only partially within a coverage range of beam 215.) User equipment 115 shown in FIG. 2 may communication with each over via sidelink communication links 135.

Figure 3A:
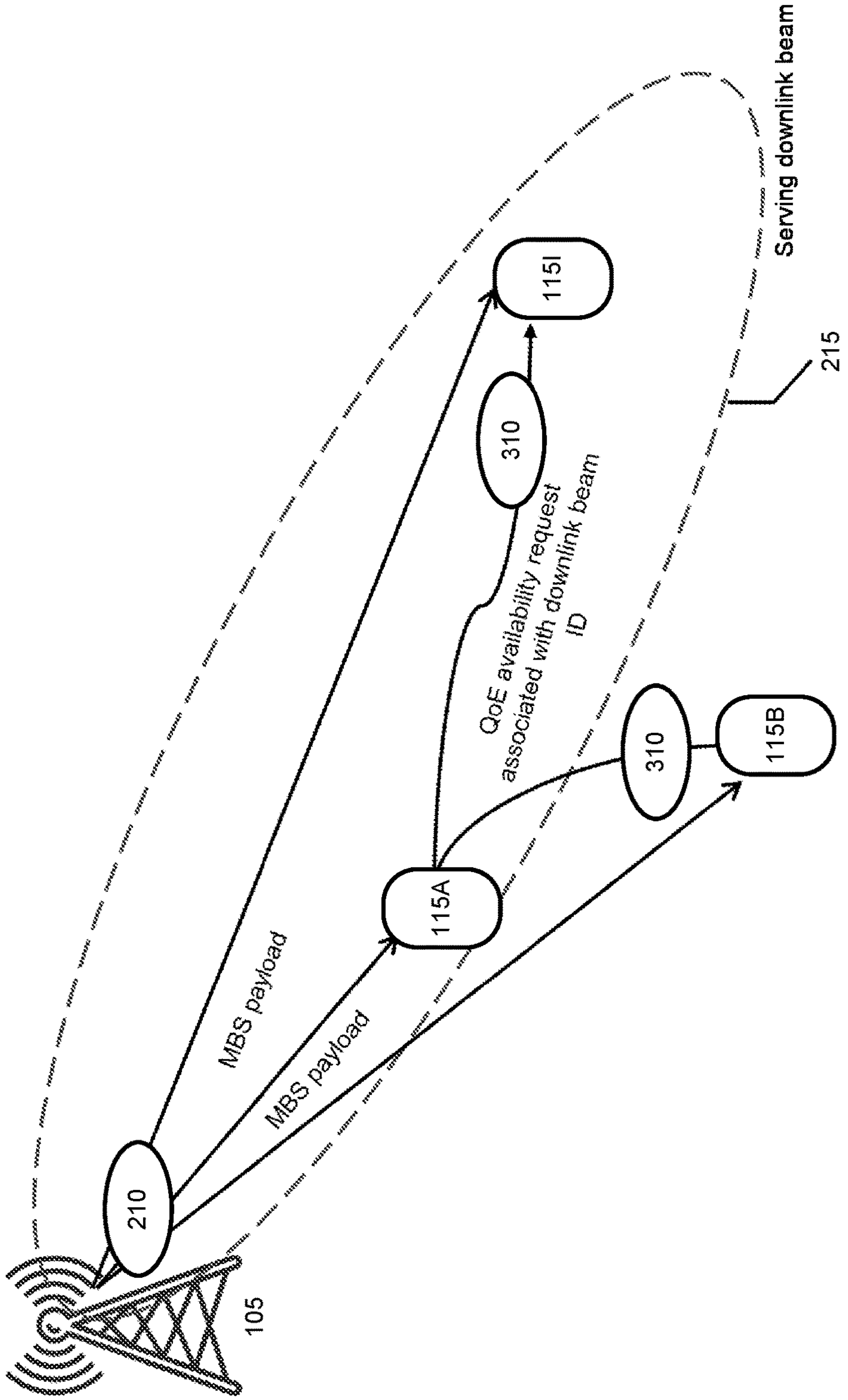
FIG. 3A illustrates a primary user equipment transmitting a quality of experience indication request to one or more secondary user equipment.

Turning now to FIG. 3A, the figure illustrates UE 115A, UE 115B, and UE 115I receiving MBS content 210 while in an idle state with respect to radio access network node 105. FIG. 3A shows a QoE reporting embodiment according to which primary user equipment device 115A, which is receiving MBS traffic payload 210 via downlink beam 215, may transmit a quality of experience indication request 310 to indicate, to secondary user equipment 115B and 115I that UE 115A is requesting a quality of experience indication corresponding to receiving, by the secondary user equipment, traffic corresponding to multicast-broadcast-service traffic flow 210. Quality of experience indication request 310 may be referred to as an availability request that requests reporting, by UE 115B or 115I, information corresponding to receiving, by UE 115B or 115I, MBS traffic 210. It will be appreciated that quality of experience indication request 310 may be transmitted and received by other user equipment that are in idle mode and that are receiving MBS traffic 210, for example other user equipment shown in FIG. 2 (e.g., other user equipment that are subscribed to the same MBS session to which traffic 210 corresponds).

Transmission of QoE indication request 310 may be performed via device-specific communication links. However, for multi-device vendor inter-operability, it may be desirable for quality of experience indication request 310 to be transmitted by a primary user equipment to one or more secondary user equipment via a sidelink interface. Accordingly, at least for sidelink transmission of a quality of experience indication request 310, the quality of experience indication request may be scrambled by primary user equipment 115A using a predefined MBS-session scrambling code (e.g., a scrambling code corresponding to a session associated with traffic 210), such that only secondary devices that have subscribed to the MBS session associated with traffic 210 can decode the quality of experience indication request. Quality of experience indication request 310 may comprise a downlink beam index/identifier corresponding to downlink beam 215 via which the primary MBS device is receiving MBS traffic 210. Primary user equipment 115A may be configured to perform primary user equipment functionality via primary user equipment configuration 207 described in reference to FIG. 2.

Figure 3B:
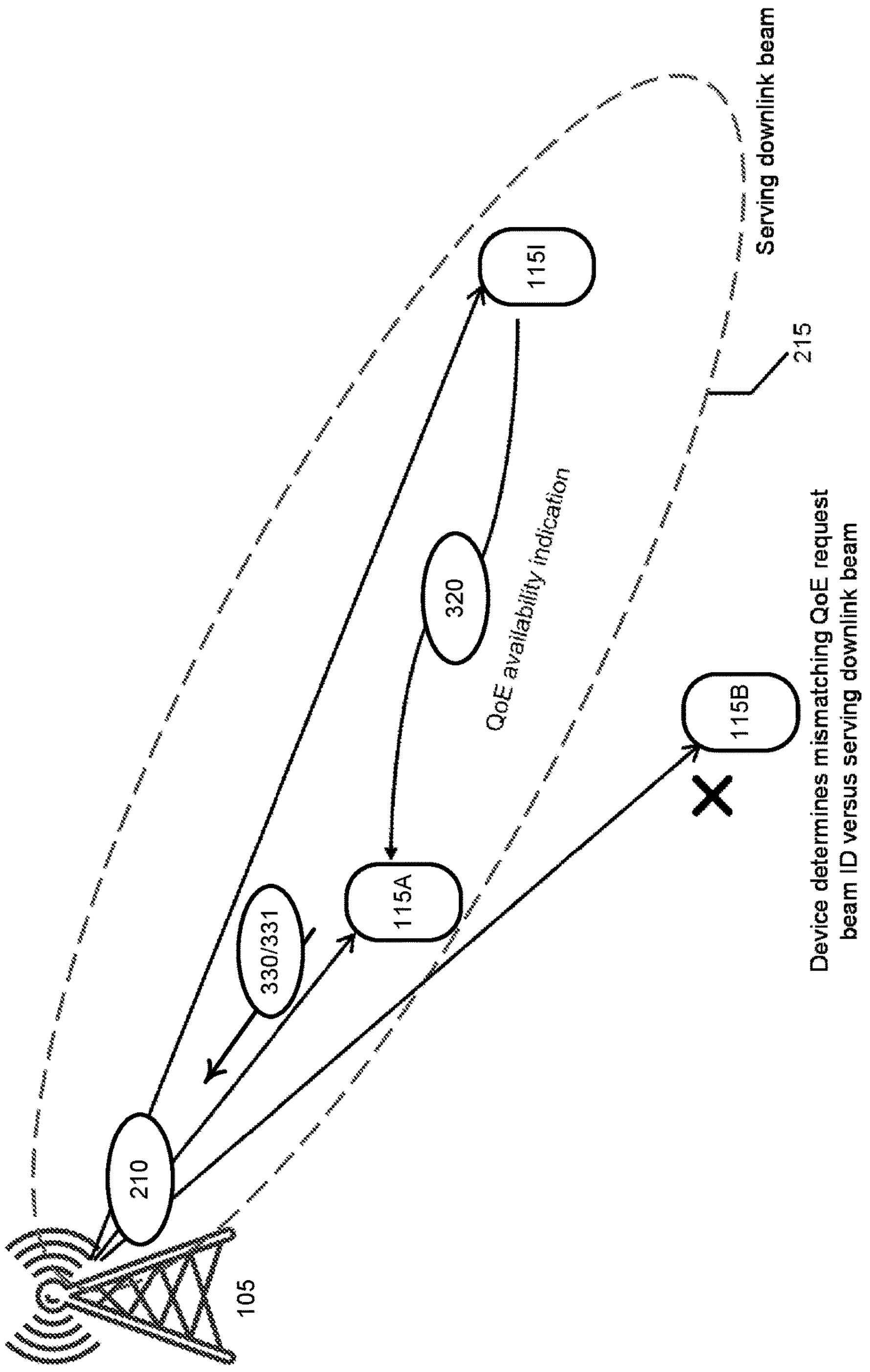
FIG. 3B illustrates quality of experience information corresponding to a serving beam being provided to a radio access network node.

As shown in FIG. 3B, after receiving a quality of experience indication request 310, a secondary user equipment, for example user equipment 115B or 115I, may determine quality of experience information corresponding to receiving, while in idle mode, MBS traffic 210. User equipment 115I may transmit to primary user equipment 115A quality of experience information in a Quality-of-Experience indication 320. Quality-of-Experience indication 320 may correspond to secondary user equipment 115I and may correspond to receiving traffic associated with traffic flow 210 by the secondary user equipment. Primary user equipment 115A may generate a Quality-of-Experience report that comprises Quality-of-Experience information contained in Quality-of-Experience indication 320 corresponding to secondary user equipment 115I. The Quality-of-Experience report may be a Quality-of-Experience availability report 330 or a Quality-of-Experience metrics report 331. Primary user equipment 115A may transmit to radio access network node 105, with respect to which the secondary user equipment is in an idle state, a Quality-of-Experience report 330/331.

A secondary user equipment, upon receiving a QoE indication request 310 from a primary user equipment, may check a downlink beam identifier/indication inside the received indication request. In case of a beam index mismatch between a beam identified in indication request 310 and a beam identifier corresponding to a beam that is serving the secondary user equipment, the secondary user equipment may disregard the QoE indication request 310, flush the received QoE indication request, and avoid responding back to the primary device with feedback with a QoE indication 320 corresponding to receiving MBS traffic. For example, as shown in FIG. 3B, secondary user equipment 115B may determine that a beam identifier or a beam index contained in indication request 310 may not correspond to a serving beam that is serving secondary user equipment 115B. Thus, as shown by a large "X" in FIG. 3B next to user equipment 115B, because user equipment 115B is not served by serving beam 215 user equipment 115B avoids transmitting to user equipment 115A a QoE indication 320, whereas user equipment 115I, which is served by serving beam 215, transmits to primary user equipment 115A a QoE indication 320. In an embodiment, secondary user equipment 115I may transmit to primary user equipment 115A QoE indication 320 that may comprise a short QoE availability report, comprising, for example, a single bit indication to indicate whether MBS QoE metric information is available to be reported or not. In another embodiment, secondary user equipment 115I may compile and report back to primary user equipment 115A QoE metrics information comprising MBS-traffic QoE parameter metrics determined by the secondary user equipment. Parameters for which actual metric(s) values may be determined and included in a QoE indication 310 may comprise: buffer playout time, buffer delay, received signal strength, application jitter, application preparation delay, and the like. In case a secondary user equipment receives multiple QoE indication requests 310 from multiple primary user equipment that indicate the same serving beam identifier/index, the secondary user equipment may only report back in an indication 320, and in response to a request 310, a QoE availability indication or QoE metrics information to the primary device having the strongest signal strength as determined by the secondary user equipment.

FIG. 4A illustrates an example aggregate Quality-of-Experience availability report 330 described in reference to FIG. 3B. As in FIG. 3, a primary sidelink device may compile aggregate QoE availability report 330, where QoE availability indications, which may be unavailability indications, are indicated by a single bit 420A-n, representing availability or not of QoE metrics (e.g., true indicative of available or false indicative of unavailable), associated with secondary user equipment identifiers 410A-n corresponding to user equipment from which such QoE availability indication(s) originated.

Figure 4B:
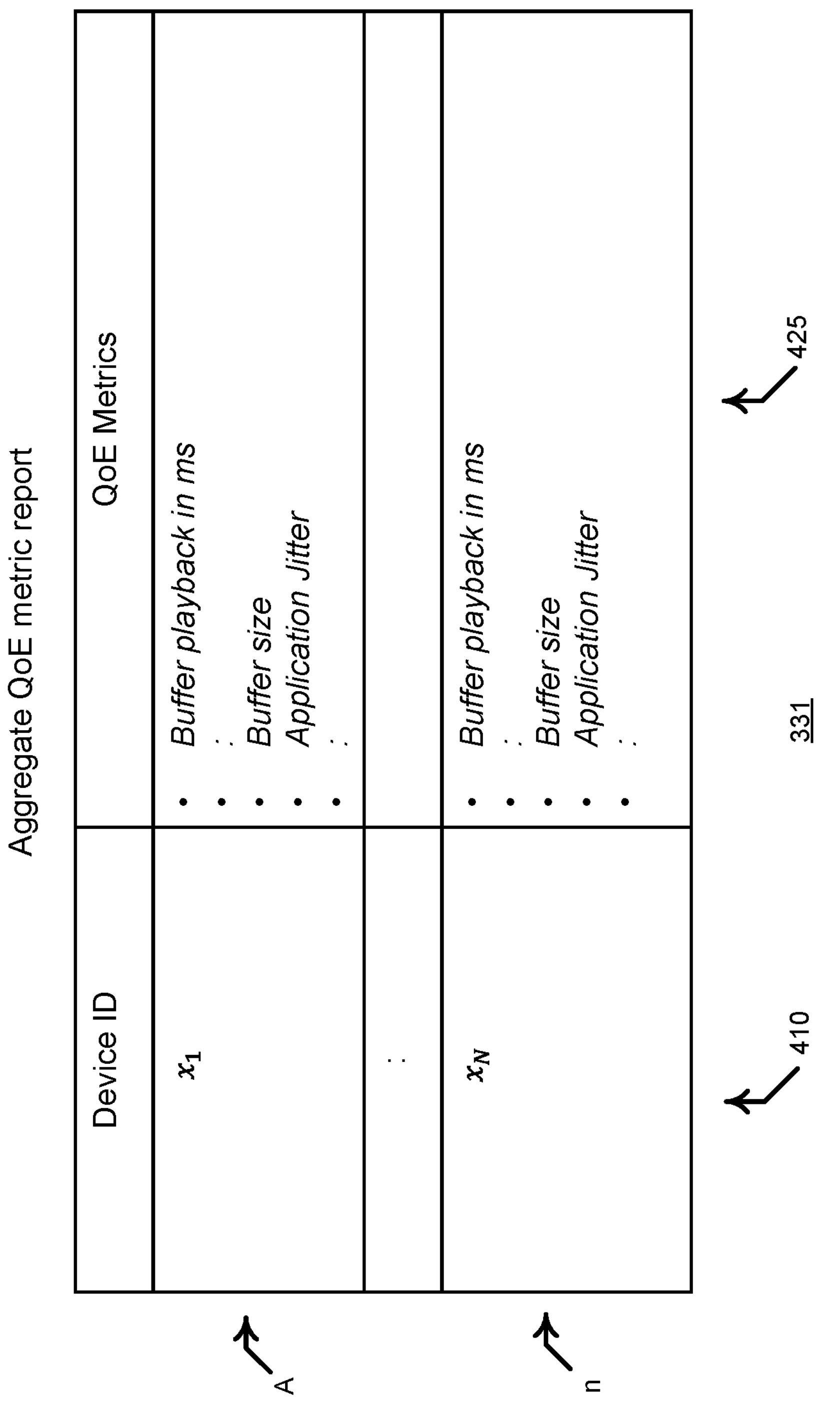
FIG. 4B illustrates a quality of experience report comprising quality of experience parameter metrics.

FIG. 4B illustrates an example aggregate Quality-of-Experience metric report 331. A metric report 331 may be compiled/generated and used by a primary user equipment to report aggregated (e.g., corresponding to multiple secondary user equipment that remain in idle mode) QoE metric information instead of only reporting aggregated QoE availability information in an QoE metric availability report 330. With a QoE metrics report 331 that comprises actual QoE parameter metrics 425A-n, a primary user equipment may make a RAN node aware of QoE metrics corresponding to secondary user equipment indicated in the metrics report 331 in fields 410A-n without the secondary user equipment having to connect (e.g., establish RRC connection(s)) with the RAN node to report thereto QoE metrics corresponding to the respective secondary user equipment. A QoE metrics report may be of different sizes at different time instants since multiple secondary user equipment devices may report back to a primary user equipment device QoE reports of different QoE metrics, which a given secondary user equipment may report back, or feed back, to a primary user equipment in response to a QoE indication request 310 based on an MBS application being executed by the secondary user equipment, a device capability corresponding to the secondary user equipment, or a metric availability. Thus, content of a QoE metrics report may be different, with different sizes, at different reporting instants. A QoE metrics report may be dynamically scheduled (e.g., treated as conventional data scheduling rather than uplink control information). For example, a primary user equipment facilitating reporting of QoE information for an MBS traffic flow may request a pool of uplink resources by transmitting, to a serving radio access network node, a scheduling grant, indicating a size, or amount, of buffered uplink data (e.g., a size of a compiled/generated QoE metrics report 331). Accordingly, uplink resource scheduling may be dynamically matched to a size of a QoE metrics report 331 that may vary with respect to time. In contrast, a metrics-available report 330 may comprise a predictable size but since only an availability at one or more secondary user equipment of QoE metrics is indicated in a report 330, a user equipment may have to exit idle mode and establish a connection with a serving radio access network node to provide the RAN node with the actual QoE parameter metrics indicated as being available.

Figure 5:
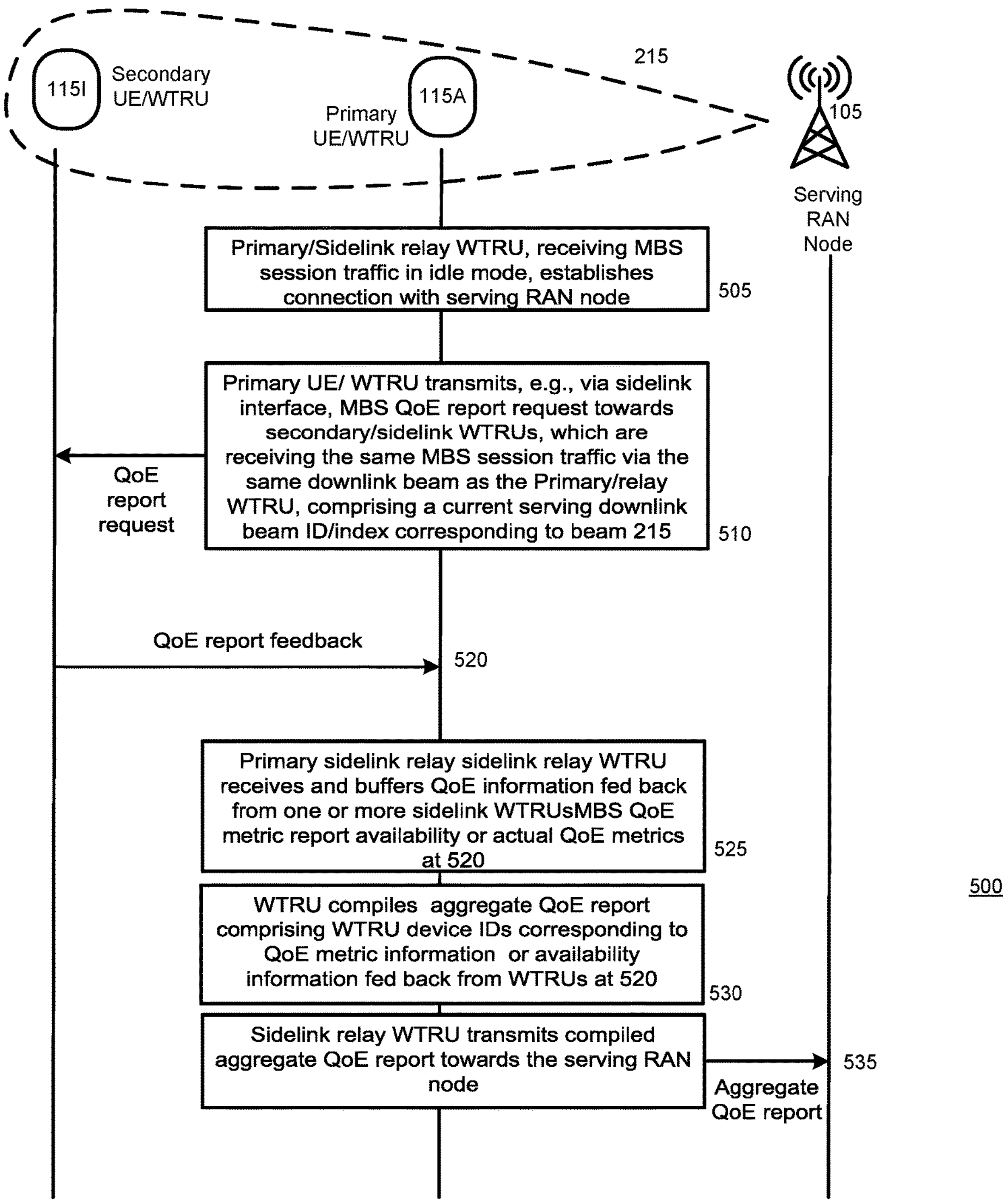
FIG. 5 illustrates a timing diagram of an example method to deliver quality of experience information corresponding to receiving of multicast broadcast service traffic by idle mode user equipment.

Turning now to FIG. 5, the figure illustrates a timing diagram of an example method 500. At act 505, primary user equipment 115A, which may function as a sidelink relay UE/WTRU with respect to secondary UE/WTRU 115I, may receive traffic of an MBS traffic flow while idle, or in an idle state or mode, and transition to a connected state with RAN node 105 based on configuration information that may have been received from the RAN node in a primary user equipment configuration (e.g., configuration 207 shown in FIG. 2) to configure the primary user equipment to request QoE information from other user equipment that are receiving the same MBS traffic flow. After establishing a connection with RAN 105 (e.g., via an RRC connection procedure), at act 510 primary/sidelink relay UE/WTRU115A may transmit to secondary user equipment 115I, which may be in an idle state while receiving the MBS traffic, an MBS QoE indication request. The QoE indication request may be transmitted via a sidelink interface/sidelink link. Secondary UE 115I may be receiving traffic of the active MBS session on the same downlink serving beam 215 as primary user equipment 115A. The QoE indication request may include an identifier indicative of serving downlink beam 215 corresponding to RAN node 105 that is delivering the MBS traffic flow to UE 115A and to UE 115I.

At act 520, responsive to a QoE indication request transmitted at act 510, secondary UE 115I may transmit to primary UE 115A QoE information/feedback, which may be referred to as a QoE indication or QoE information. In an embodiment, QoE information/feedback may comprise QoE metric availability information, which may indicate to UE 115A that UE 115I has QoE parameter metrics available to be provided to RAN 105. In an embodiment, QoE information/feedback transmitted at act 520 may comprise actual QoE parameter metrics corresponding to receiving, by UE 115I, of the MBS traffic flow.

At act 525, primary UE/WTRU 115A may buffer QoE metric availability indications, or actual metrics, received from one or more secondary UEs/WTRUs, such as UE 115I. At act 530, primary user equipment 115A may compile a Quality-of-Experience report. A QoE report may comprise a QoE indication corresponding to secondary user equipment 115I. An indication in a QoE report may comprise a QoE availability indication, or actual QoE metrics. A QoE report may comprise identifiers corresponding to UE/WTRU 115I, or other secondary user equipment, that have indicated MBS QoE metric availability or actual QoE metrics. At act 535, primary user equipment 115A may transmit a QoE report generated at act 530 to serving RAN node 105. In an embodiment, if a QoE report comprises a metrics availability indication corresponding to UE 115I, RAN node 105 may transmit to UE 115I a request to establish a connection with the RAN node (e.g., perform an RRC connection establishment procedures) to transmit, to the RAN node, actual QoE metrics that were indicated as being available at the secondary UE 115I.

Figure 6:
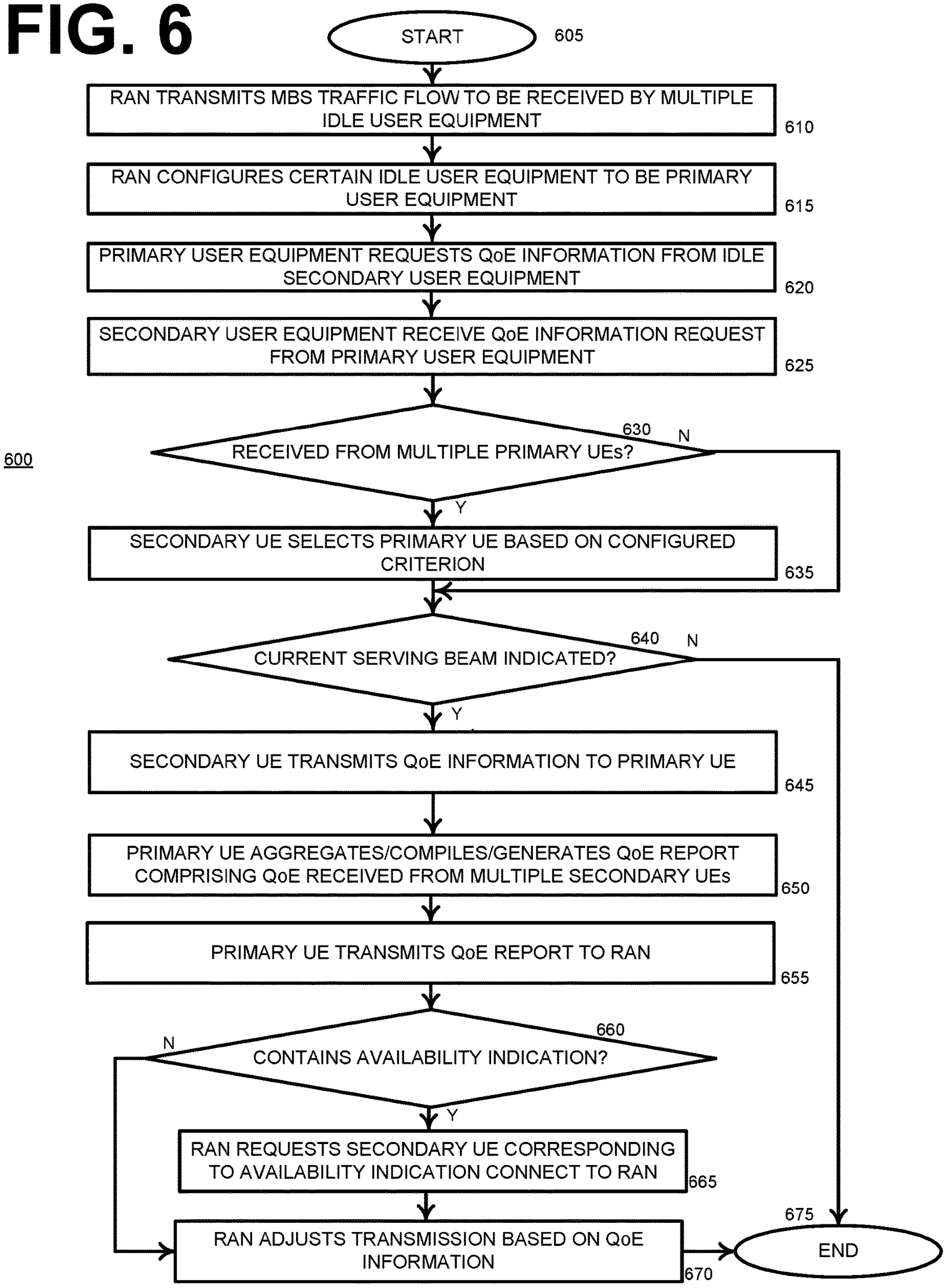
FIG. 6 illustrates a flow diagram of an example method to deliver quality of experience information corresponding to receiving of multicast broadcast service traffic by idle mode user equipment.

Turning now to FIG. 6, the figure illustrates a flow diagram of an example method 600. Method 600 begins at act 605. At act 610, a radio access network node may be transmitting traffic of a multicast broadcast service traffic flow to multiple idle user equipment that are receiving the traffic. At act 615, the radio access network node may configure one or more of the idle user equipment that are receiving the MBS traffic as primary user equipment via a primary user equipment configuration. At act 620, a primary user equipment may transmit a request for quality of experience information, or an indication thereof, corresponding to idle secondary user equipment that are receiving the MBS traffic. At act 625, one or more secondary user equipment may receive a quality of experience information request transmitted at act 620 by primary user equipment.

At act 630, a secondary user equipment may determine whether a quality of experience information request has been received from more than one primary user equipment. If a determination is made at act 630 that the secondary user equipment has received quality of experience information requests for more than one primary user equipment, the secondary user equipment may select at act 635 a quality of experience information request corresponding to a primary user equipment with respect to which a criterion, for example a signal strength criterion, is satisfied. (E.g., The secondary user equipment may select the quality of experience information request received from the primary user equipment that the secondary user equipment determines corresponds to a strongest signal strength of primary user equipment from which the secondary user equipment may have received a quality of experience information request.) After the secondary user equipment selects the quality of experience information request to which to respond, or if a determination is made at act 630 that only one quality of experience information request was received by the secondary user equipment, the secondary user equipment may determine at act 640 whether the selected, or only, quality of experience information request received by the secondary user equipment comprises a beam indication corresponding to a beam that is currently serving the secondary user equipment.

A quality of experience information request that does not comprise a beam indication corresponding to a beam that is currently serving the secondary user equipment may be deemed by the secondary user equipment as a quality of experience information request to which the secondary user equipment does not need to respond. A beam indication contained in a quality of experience information request may correspond to a beam serving the primary user equipment that transmitted the quality of experience information request. Thus, if a beam identifier contained in a quality of experience request does not correspond to a beam serving MBS traffic to the secondary user equipment the primary user equipment that transmitted the quality of experience information request may not be configured to facilitate receiving and delivering to the radio access network node quality of experience information corresponding to the secondary user equipment. Accordingly, if a secondary user equipment determines at act 640 that a beam that is currently serving MBS traffic to the secondary user equipment is not indicated in a quality of experience information request received at act 625, the secondary user equipment may disregard the quality of experience information request and method 600 may advance to act 675 and end.

Returning to description of act 640, if a determination is made that a quality of experience information request received at act 625 comprises a beam identifier corresponding to a beam that is currently serving the secondary user equipment, the secondary user equipment may transmit at act 645 quality of experience information, or an indication thereof, to the primary user equipment that transmitted the quality of experience information request. The quality experience information transmitted by the secondary user equipment responsive to the quality of experience information request may comprise a metric availability indication indicative that the secondary user equipment has quality of experience metric information available to be transmitted. The availability indication may comprise a single bit indicating that the secondary user equipment does, or does not, have actual quality of experience metric information available. Transmitting a quality of experience metric availability indication instead of transmitting actual quality of experience metric information may reduce the size of quality of experience information transmitted by the secondary user equipment at act 645 responsive to the quality of experience information request transmitted by the primary user equipment at act 625 because actual quality of experience metric information may comprise multiple bytes of data whereas a quality of experience metric availability indication may only comprise one bit.

At act 650, a primary user equipment may aggregate/compile/generate a quality of experience report comprising quality of experience information transmitted by multiple idle secondary user equipment responsive to a quality of experience information request transmitted by the primary user equipment at act 625. A quality of experience report, for example a report 330 or report 331 described in reference to FIG. 3B, may comprise availability indications corresponding to the multiple idle secondary user equipment (e.g., a report 330), or actual metric information (e.g., a report 331) corresponding to the multiple idle secondary user equipment, respectively, transmitted by the multiple idle secondary user equipment responsive to a quality of experience information request transmitted by the primary user equipment at act 625. At act 655, the primary user equipment may transmit the quality of experience report generated at act 650 to the radio access network node. The primary user equipment may transmit the quality of experience report while in a connected state with respect to the radio access network node, which connected state may have been earlier-established, or which may be established at act 655.

At act 660, the radio access network node may determine whether the quality of experience report transmitted by the primary user equipment at act 655 comprises metric availability indications or actual metric values or data. If a determination is made at act 660 that the quality of the experience report comprises metric availability indications, at act 665 the radio access network node may request that secondary user equipment, associated with user equipment identifiers that correspond in the quality of experience report to availability indications, establish a connection, for example an RRC connection, with the radio access network node and transmit, to the radio access network node, actual quality of experience metrics corresponding to the quality of experience availability indications. At act 670, the radio access network node may adjust transmission to one or more of secondary user equipment identified in a quality experience report (e.g., a report 330 or report 331 described in reference to FIG. 3B), based on metrics indicated in a quality of experience report 331 or corresponding to availability indications indicated in a quality of experience report 330. Returning to description of act 660, if a determination is made that a quality of experience report does not comprise availability indications, radio access network node may advance to act 670 and adjust transmission to one or more secondary user equipment. After adjusting transmission to one or more secondary user equipment at act 670, method 600 advances to act 675 and ends.

Because a radio access network node transmits a traffic flow according to a multicast broadcast service via single traffic flow having a single transmission configuration, single modulation, and single coding that applies to all user equipment receiving the MBS traffic flow, reception of the NBS traffic flow by different user equipment may differ according to different channel conditions (e.g., distance, interferences, reflections, etc.) that may exist between the different user equipment and the radio access network node. The radio act network node may thus use conservative transmission parameter settings corresponding to modulation, coding, etc. that may be selected by the radio access network node to accommodate delivery of the MBS traffic flow to a user equipment, of the multiple user equipment, having the poorest channel conditions with respect to the radio access network node. Although this may facilitate reliable delivery of the MBS traffic flow to an idle user equipment, of multiple user equipment, experiencing the poorest channel conditions with respect to the other user equipment, this may result in severely degraded spectral efficiency since the selected transmission parameter settings may be more conservative than needed to accommodate most of the multiple user equipment. Accordingly, using embodiments described herein, a radio access network node may, for a user equipment determined to have poor channel conditions based on a quality of experience report identified to be receiving the MBS payload with poor quality, the network may alter, or adjust at act 670 transmission of the MBS traffic flow. For example, if a user equipment is experiencing extremely poor reception quality (e.g., a QoE metric is below a configured threshold), the RAN node may cause the user equipment having the poor reception to transition to a connected mode with respect to the RAN node, and the RAN node may use scheduling dedicated to the user equipment, and may use device-specific link adaptation, such that transmission of the MBS traffic to the user equipment is tuned to match the user equipment's specific channel conditions without impacting MBS transmission to other user equipment that are not experiencing such poor reception quality. It will be appreciated that the determination by the RAN of the channel conditions corresponding to different user equipment may be based on QoE metrics indicated or transmitted in a QoE report 330 or 331. In the case of an idle user equipment experiencing slightly poor reception quality compared to other idle user equipment receiving an MBS traffic flow, a RAN node may determine to slightly alter, or adjust, a transmission configuration corresponding to the MBS payload for all of the idle user equipment. For example, increasing a transmission encoding strength by one step may resolve reliability of reception of the MBS traffic flow at the user equipment experiencing slightly poor reception without adjusting the transmission parameters too conservatively, thus facilitating the user equipment experiencing poor channel conditions, as well as the other user equipment, continuing to receive the MBS traffic flow while in an idle state.

A primary user equipment may analyze a quality-of-experience metric with respect to a quality-of-experience metric criterion to result in an analyzed Quality-of-Experience metric. For example, a primary user equipment may receive a QoE metric from a secondary UE and make a determination that the QoE metric is indicative of poor channel conditions with respect to the secondary user equipment. The primary user equipment may determine to include, or not include, the QoE metric in a QoE report based on the analyzed QoE metric satisfying the QoE criterion. In another embodiment, the primary user equipment may merely compile all QoE metrics received from secondary user equipment responsive to a quality of experience information request into a QoE report without making a determination whether or not to include the QoE metrics in the report. Such determination may be based on a processing capability of the primary user equipment. However, it will be appreciated that performing analysis of a QoE metric by a primary user equipment and determining whether or not to include the metric in a QoE report may reduce the size of the report if metrics corresponding to some of the idle secondary user equipment are determined by the primary user equipment, based on analysis with respect to the criterion, not to be indicative of poor channel conditions and thus may not need to be transmitted to the radio access network node for adjustment of transmission parameters with respect to the secondary user equipment.

Figure 7:
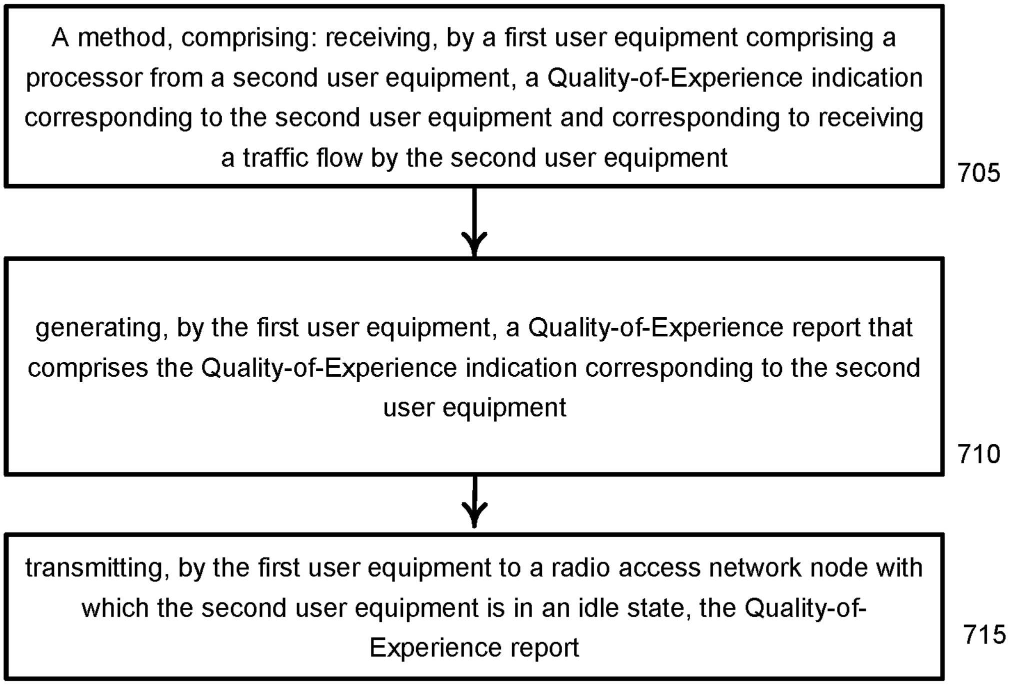
FIG. 7 illustrates a block diagram of an example method.

Turning now to FIG. 7, the figure illustrates an example embodiment method 700 comprising at block 705 receiving, by a first user equipment comprising a processor from a second user equipment, a Quality-of-Experience indication corresponding to the second user equipment and corresponding to receiving a traffic flow by the second user equipment; at block 710 generating, by the first user equipment, a Quality-of-Experience report that comprises the Quality-of-Experience indication corresponding to the second user equipment; and at block 715 transmitting, by the first user equipment to a radio access network node with which the second user equipment is in an idle state, the Quality-of-Experience report.

Figure 8:
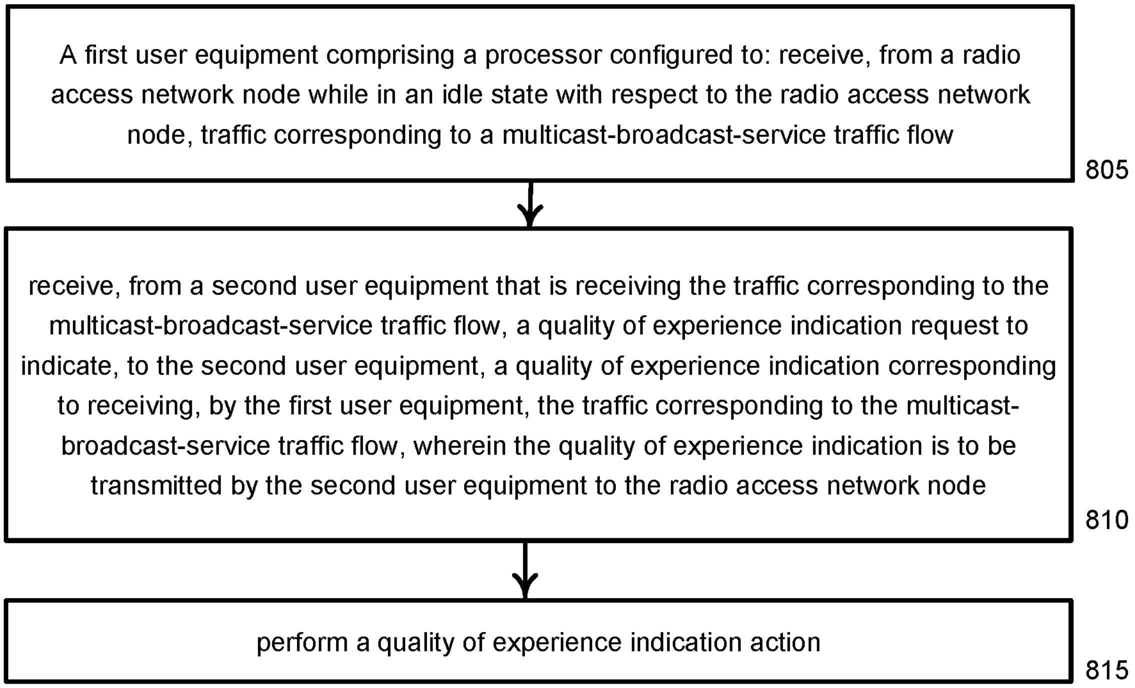
FIG. 8 illustrates a block diagram of an example user equipment.

Turning now to FIG. 8, the figure illustrates a first user equipment 800, comprising at block 805 a processor configured to receive, from a radio access network node while in an idle state with respect to the radio access network node, traffic corresponding to a multicast-broadcast-service traffic flow; at block 810 receive, from a second user equipment that is receiving the traffic corresponding to the multicast-broadcast-service traffic flow, a quality of experience indication request to indicate, to the second user equipment, a quality of experience indication corresponding to receiving, by the first user equipment, the traffic corresponding to the multicast-broadcast-service traffic flow, wherein the quality of experience indication is to be transmitted by the second user equipment to the radio access network node; and at block 815 perform a quality of experience indication action.

Figure 9:
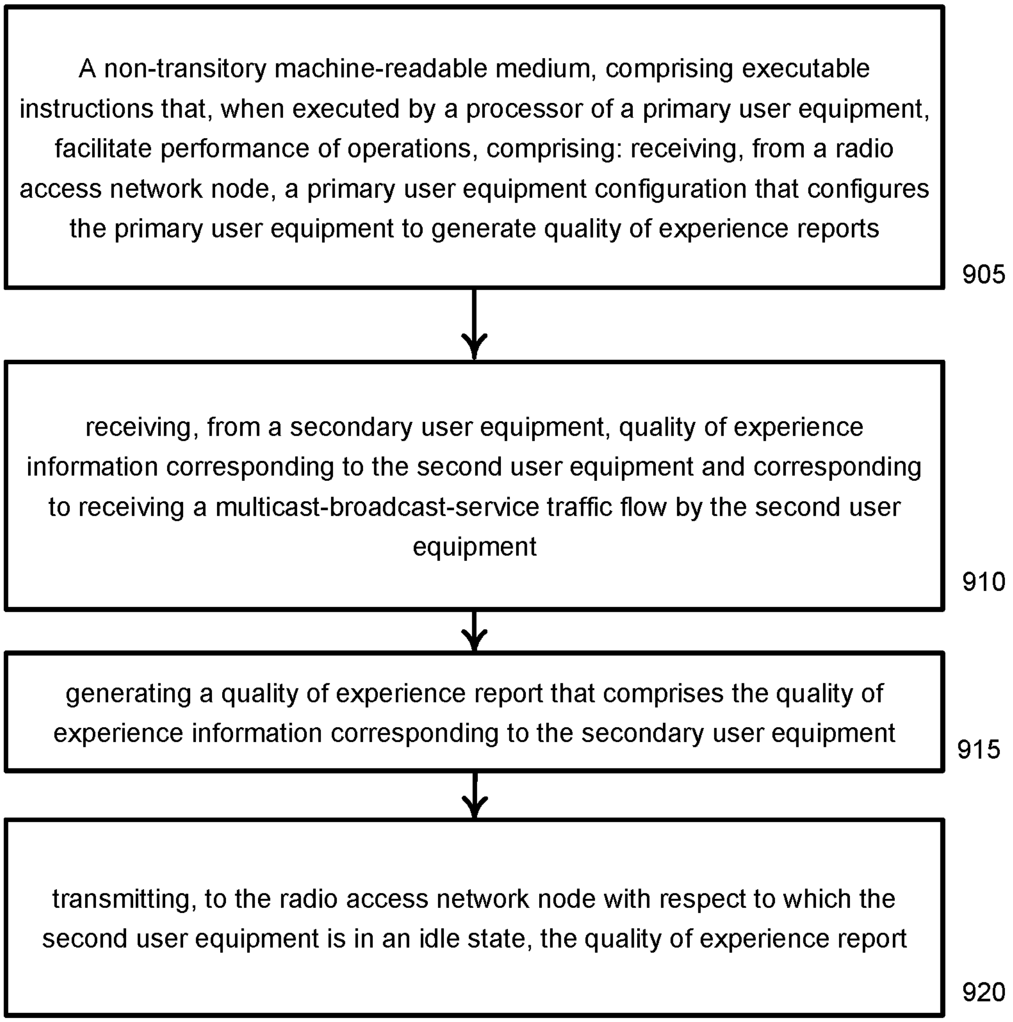
FIG. 9 illustrates a block diagram of an example non-transitory machine-readable medium.

Turning now to FIG. 9, the figure illustrates a non-transitory machine-readable medium 900 comprising at block 905 executable instructions that, when executed by a processor of a primary user equipment, facilitate performance of operations, comprising receiving, from a radio access network node, a primary user equipment configuration that configures the primary user equipment to generate quality of experience reports; at block 910 receiving, from a secondary user equipment, quality of experience information corresponding to the second user equipment and corresponding to receiving a multicast-broadcast-service traffic flow by the second user equipment; at block 915 generating a quality of experience report that comprises the quality of experience information corresponding to the secondary user equipment; and at block 920 transmitting, to the radio access network node with respect to which the second user equipment is in an idle state, the quality of experience report.

Figure 10:
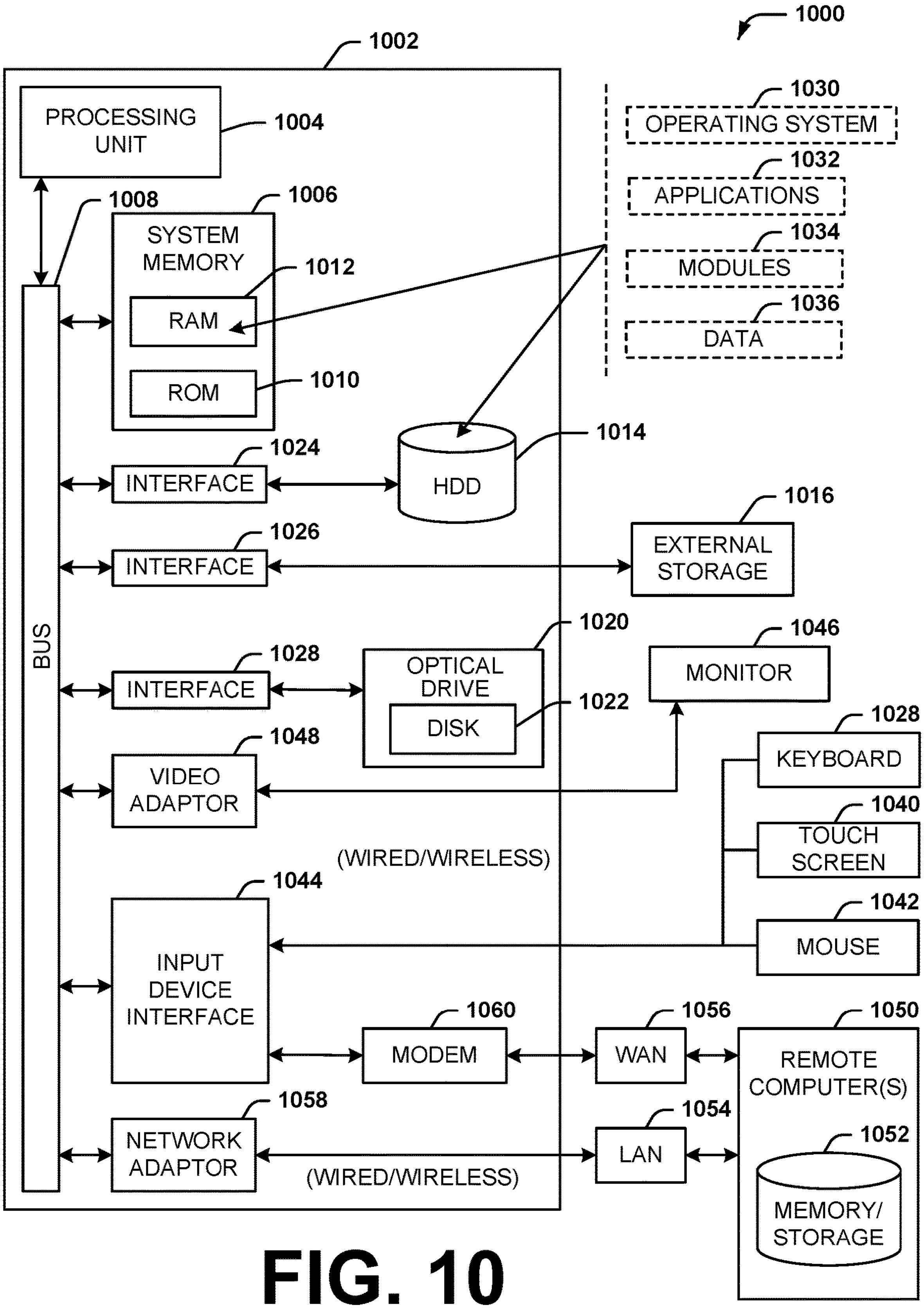
FIG. 10 illustrates an example computer environment.

In order to provide additional context for various embodiments described herein, FIG. 10 and the following discussion are intended to provide a brief, general description of a suitable computing environment 1000 in which various embodiments of the embodiment described herein can be implemented. While embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, IoT devices, distributed computing systems, as well as personal computers, hand-held computing devices, microprocessor-based or programmable consumer electronics, and the like, each of which can be operatively coupled to one or more associated devices.

The embodiments illustrated herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors and may include a cache memory. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

Computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc 1022, a DVD, a BD, etc.). While the internal HDD 1014 is illustrated as located within the computer 1002, the internal HDD 1014 can also be configured for external use in a suitable chassis (not shown).

Additionally, while not shown in environment 1000, a solid-state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can comprise a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are examples and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

Figure 11:
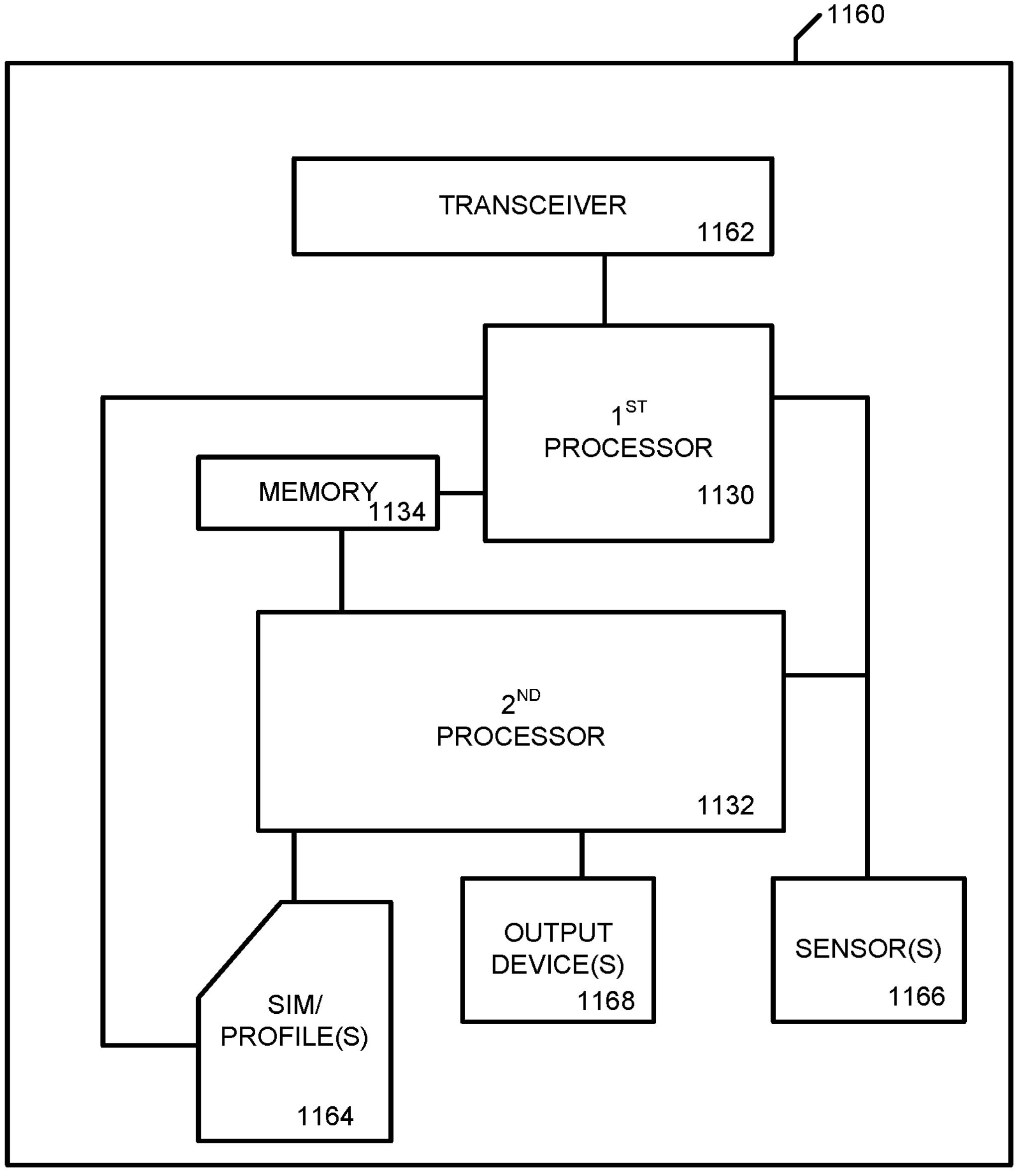
FIG. 11 illustrates a block diagram of an example wireless UE.

Turning to FIG. 11, the figure illustrates a block diagram of an example UE 1160. UE 1160 may comprise a smart phone, a wireless tablet, a laptop computer with wireless capability, a wearable device, a machine device that may facilitate vehicle telematics, a tracking device, remote sensing devices, and the like. UE 1160 comprises a first processor 1130, a second processor 1132, and a shared memory 1134. UE 1160 includes radio front end circuitry 1162, which may be referred to herein as a transceiver, but is understood to typically include transceiver circuitry, separate filters, and separate antennas for facilitating transmission and receiving of signals over a wireless link, such as one or more wireless links 125, 135, and 137 shown in FIG. 1. Furthermore, transceiver 1162 may comprise multiple sets of circuitry or may be tunable to accommodate different frequency ranges, different modulations schemes, or different communication protocols, to facilitate long-range wireless links such as links, device-to-device links, such as links 135, and short-range wireless links, such as links 137.

Continuing with description of FIG. 11, UE 1160 may also include a SIM 1164, or a SIM profile, which may comprise information stored in a memory (memory 1134 or a separate memory portion), for facilitating wireless communication with RAN 105 or core network 130 shown in FIG. 1. FIG. 11 shows SIM 1164 as a single component in the shape of a conventional SIM card, but it will be appreciated that SIM 1164 may represent multiple SIM cards, multiple SIM profiles, or multiple eSIMs, some or all of which may be implemented in hardware or software. It will be appreciated that a SIM profile may comprise information such as security credentials (e.g., encryption keys, values that may be used to generate encryption keys, or shared values that are shared between SIM 1164 and another device, which may be a component of RAN 105 or core network 130 shown in FIG. 1). A SIM profile 1164 may also comprise identifying information that is unique to the SIM, or SIM profile, such as, for example, an International Mobile Subscriber Identity ("IMSI") or information that may make up an IMSI.

SIM 1164 is shown coupled to both the first processor portion 1130 and the second processor portion 1132. Such an implementation may provide an advantage that first processor portion 1130 may not need to request or receive information or data from SIM 1164 that second processor 1132 may request, thus eliminating the use of the first processor acting as a 'go-between' when the second processor uses information from the SIM in performing its functions and in executing applications. First processor 1130, which may be a modem processor or a baseband processor, is shown smaller than processor 1132, which may be a more sophisticated application processor, to visually indicate the relative levels of sophistication (i.e., processing capability and performance) and corresponding relative levels of operating power consumption levels between the two processor portions. Keeping the second processor portion 1132 asleep/inactive/in a low power state when UE 1160 does not need it for executing applications and processing data related to an application provides an advantage of reducing power consumption when the UE only needs to use the first processor portion 1130 while in listening mode for monitoring routine configured bearer management and mobility management/maintenance procedures, or for monitoring search spaces that the UE has been configured to monitor while the second processor portion remains inactive/asleep.

UE 1160 may also include sensors 1166, such as, for example, temperature sensors, accelerometers, gyroscopes, barometers, moisture sensors, and the like that may provide signals to the first processor 1130 or second processor 1132. Output devices 1168 may comprise, for example, one or more visual displays (e.g., computer monitors, VR appliances, and the like), acoustic transducers, such as speakers or microphones, vibration components, and the like. Output devices 1168 may comprise software that interfaces with output devices, for example, visual displays, speakers, microphones, touch sensation devices, smell or taste devices, and the like, that are external to UE 1160.

The following glossary of terms given in Table 1 may apply to one or more descriptions of embodiments disclosed herein.

TABLE 1

| Term | Definition |
|---|---|
| UE | User equipment |
| WTRU | Wireless transmit receive unit |
| RAN | Radio access network |
| QoS | Quality of service |
| DRX | Discontinuous reception |
| EPI | Early paging indication |
| DCI | Downlink control information |
| SSB | Synchronization signal block |
| RS | Reference signal |
| PDCCH | Physical downlink control channel |
| PDSCH | Physical downlink shared channel |
| MUSIM | Multi-SIM UE |
| SIB | System information block |
| MIB | Master information block |
| eMBB | Enhanced mobile broadband |
| URLLC | Ultra reliable and low latency communications |
| mMTC | Massive machine type communications |
| XR | Anything-reality |
| VR | Virtual reality |
| AR | Augmented reality |
| MR | Mixed reality |
| DCI | Downlink control information |
| DMRS | Demodulation reference signals |
| QPSK | Quadrature Phase Shift Keying |
| WUS | Wake up signal |
| HARQ | Hybrid automatic repeat request |
| RRC | Radio resource control |
| C-RNTI | Connected mode radio network temporary identifier |
| CRC | Cyclic redundancy check |
| MIMO | Multi input multi output |
| AI | Artificial intelligence |
| ML | Machine learning |
| QCI | QoS Class Identifiers |
| BSR | Buffer status report |
| SBFD | Sub-band full duplex |
| CLI | Cross link interference |
| TDD | Time division duplexing |
| FDD | Frequency division duplexing |
| AI | Artificial intelligence |
| ML | Machine learning |
| MCS | Modulation and coding scheme |
| IE | Information element |
| BS | Base station |
| RRC | Radio resource control |
| UCI | Uplink control information |
| MBS | Multicast broadcast service |

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above-described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" or variations thereof as may be used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:

receiving, by a first user equipment, comprising at least one processor, from a second user equipment, a Quality-of-Experience indication corresponding to the second user equipment and corresponding to receiving a traffic flow by the second user equipment;

generating, by the first user equipment, a Quality-of-Experience report that comprises the Quality-of-Experience indication corresponding to the second user equipment; and transmitting, by the first user equipment to a radio access network node with which the second user equipment is in an idle state, the Quality-of-Experience report, wherein the Quality-of-Experience indication comprises a Quality-of-Experience metric unavailability indication indicative that a Quality-of-Experience metric is unavailable, at the second user equipment, to be reported to the radio access network node, and wherein the first user equipment avoids including the Quality-of-Experience metric unavailability indication in the Quality-of-Experience report.

2. The method of claim 1, wherein the Quality-of-Experience indication corresponds to a Quality-of-Experience parameter associated with an application being executed by a processor of the second user equipment.

3. The method of claim 1, wherein the traffic flow is a multicast-and-broadcast-service traffic flow.

4. The method of claim 1, wherein the Quality-of-Experience indication comprises a Quality-of-Experience metric.

5. The method of claim 4, further comprising:

analyzing, by the first user equipment, the Quality-of-Experience metric with respect to a Quality-of-Experience metric criterion to result in an analyzed Quality-of-Experience metric, wherein the generating of the Quality-of-Experience report to comprise the Quality-of-Experience indication corresponding to the second user equipment is based on the analyzed Quality-of-Experience metric being determined to satisfy the Quality-of-Experience metric criterion.

6. The method of claim 1, wherein the second user equipment is served by a serving beam corresponding to the radio access network node, the method further comprising:

transmitting, by the first user equipment, a Quality-of-Experience indication request receivable by the second user equipment and at least a third user equipment that is served by the serving beam corresponding to the radio access network node, wherein the Quality-of-Experience indication request comprises a beam identifier corresponding to the serving beam.

7. The method of claim 6, wherein the Quality-of-Experience indication request is transmitted via a sidelink communication link.

8. The method of claim 6, wherein the Quality-of-Experience report comprises the first Quality-of-Experience indication associated with an identifier corresponding to the second user equipment and indicative of a first Quality-of-Experience metric corresponding to the receiving of the traffic flow by the second user equipment and a second Quality-of-Experience indication associated with an identifier corresponding to the third user equipment and indicative of a second Quality-of-Experience metric corresponding to the receiving of the traffic flow by the third user equipment.

9. The method of claim 1, wherein the Quality-of-Experience report comprises quality of experience information received from idle secondary user equipment, including the second user equipment and user equipment other than the second user equipment.

10. A first user equipment, comprising:

at least one processor configured to:

receive, from a radio access network node while in an idle state with respect to the radio access network node, traffic corresponding to a multicast-broadcast-service traffic flow;

receive, from a second user equipment that is receiving the traffic corresponding to the multicast-broadcast-service traffic flow, a quality of experience indication request to indicate, to the second user equipment, a quality of experience indication corresponding to receiving, by the first user equipment, the traffic corresponding to the multicast-broadcast-service traffic flow, wherein the quality of experience indication is to be transmitted by the second user equipment to the radio access network node;

determine that the first user equipment is being served by a first serving beam;

based on a beam identifier contained in the quality of experience indication request, determine that the second user equipment is being served by a second serving beam; and based on the beam identifier contained in the quality of experience indication request, perform a quality of experience indication action.

11. The first user equipment of claim 10, wherein the first serving beam and the second serving beam are the same, and wherein the quality of experience indication action comprises transmitting, to the second user equipment, a quality of experience indication indicative of a quality of experience metric corresponding to receiving, by the first user equipment, the traffic corresponding to the multicast-broadcast-service traffic flow.

12. The first user equipment of claim 11, wherein the quality of experience indication request is a first quality of experience indication request, wherein the processor is further configured to:

receive, from a third user equipment that is receiving the traffic corresponding to the multicast-broadcast-service traffic flow and that is served by the serving beam, a second quality of experience indication request to indicate to the third user equipment a quality of experience indication corresponding to receiving, by the first user equipment, the traffic corresponding to the multicast-broadcast-service traffic flow; wherein the quality of experience indication is to be transmitted by the third user equipment to the radio access network node; and determine that the second user equipment corresponds to a first signal strength that is stronger with respect to the first user equipment than a second signal strength, corresponding to the third user equipment, with respect to the first user equipment, wherein the quality of experience indication action further comprises avoiding transmitting, to the third user equipment, a quality of experience indication indicative of a quality of experience metric corresponding to receiving, by the first user equipment, the traffic corresponding to the multicast-broadcast-service traffic flow.

13. The first user equipment of claim 11, wherein the first serving beam, the second serving beam, and at least one other serving beam serving at least one other user equipment are the same and wherein the wherein the quality of experience indication action further comprises transmitting, to the at least one other user equipment, the quality of experience indication indicative of a quality of experience metric corresponding to receiving, by the first user equipment, the traffic corresponding to the multicast-broadcast-service traffic flow.

14. The first user equipment of claim 10, wherein the first serving beam and the second serving beam are different, and wherein the quality of experience indication action comprises avoiding transmitting, to the second user equipment, a quality of experience indication indicative of a quality of experience metric corresponding to receiving, by the first user equipment, the traffic corresponding to the multicast-broadcast-service traffic flow.

15. The first user equipment of claim 10, wherein the quality of experience indication action comprises transmitting, to the second user equipment, a quality of experience indication indicative of a quality of experience metric corresponding to receiving, by the first user equipment, the traffic corresponding to the multicast-broadcast-service traffic flow, wherein the second user equipment transmits, to the radio access network node, the quality of experience indication, and wherein the processor is further configured to:

receive, from the radio access network node, a connection establishment request, transmission of which is facilitated by the radio access network node in response to the quality of experience indication;

responsive to the connection establishment request, establish a connection with the radio access network node; and transmit, to the radio access network node, the quality of experience metric.

16. A non-transitory machine-readable medium, comprising executable instructions that, when executed by a processor of a primary user equipment, facilitate performance of operations, comprising:

receiving, from a radio access network node, a primary user equipment configuration that configures the primary user equipment to generate quality of experience reports;

receiving, from at least one secondary user equipment, quality of experience information corresponding to the second user equipment and corresponding to receiving a multicast-broadcast-service traffic flow by the secondary user equipment;

generating a quality of experience report that comprises the quality of experience information corresponding to the at least one secondary user equipment;

transmitting, to the radio access network node with respect to which the at least one secondary user equipment is in an idle state, the quality of experience report, wherein the primary user equipment is served by a serving beam corresponding to the radio access network node;

receiving, from the radio access network node, a performance indication paging message corresponding to the serving beam; and transmitting, to the radio access network node, a beam signal strength indication indicative of a signal strength corresponding to the serving beam with respect to the primary user equipment, wherein the primary user equipment configuration is directed to the primary user equipment by the radio access network node based on the beam signal strength indication, and wherein the primary user equipment avoids entering a connected state with respect to the radio access network node to transmit the beam signal strength indication.

17. The non-transitory machine-readable medium of claim 16, wherein the primary user equipment configuration further configures the primary user equipment to transmit, to the at least one secondary user equipment, a quality of experience information request to transmit to the primary user equipment the quality of experience information.

18. The non-transitory machine-readable medium of claim 16, wherein the primary user equipment configuration is received from the radio access network node based on the primary user equipment being served by the serving beam corresponding to the radio access network node and wherein the primary user equipment configuration is received from the radio access network node based on the serving beam being determined to be a best beam with respect to the primary user equipment according to a signal strength measurement, associated with the serving beam, that was transmitted by the primary user equipment when the primary user equipment was most recently in a connected state with respect to the radio access network node.

19. The non-transitory machine-readable medium of claim 16, wherein the at least one secondary user equipment comprises multiple user equipment, and wherein the quality of experience report comprises quality of experience information transmitted by the multiple secondary user equipment responsive to a quality of experience information request transmitted by the primary user equipment.

20. The non-transitory machine-readable medium of claim 16, wherein the primary user equipment configuration is received from the radio access network responsive to the receiving of the performance indication paging message.

* * * * *